(12) United States Patent
Saha et al.

(10) Patent No.: US 11,410,346 B1
(45) Date of Patent: Aug. 9, 2022

(54) GENERATING AND ADJUSTING A PROPORTIONAL PALETTE OF DOMINANT COLORS IN A VECTOR ARTWORK

(71) Applicant: Adobe Inc., San Jose, CA (US)

(72) Inventors: Ankita Saha, Delhi (IN); Nitesh Dodeja, Delhi (IN); Rakesh Baidya, Delhi (IN); Rajeev Kumar, Bihar (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/160,901

(22) Filed: Jan. 28, 2021

(51) Int. Cl.
| | |
|---|---|
| *G06T 11/00* | (2006.01) |
| *G06T 11/60* | (2006.01) |
| *G06V 10/56* | (2022.01) |
| *G09G 5/02* | (2006.01) |
| *G09G 5/06* | (2006.01) |
| *H04N 1/60* | (2006.01) |

(52) U.S. Cl.
CPC ............ *G06T 11/001* (2013.01); *G06T 11/60* (2013.01); *G06V 10/56* (2022.01)

(58) Field of Classification Search
CPC combination set(s) only.
See application file for complete search history.

(56) References Cited

U.S. PATENT DOCUMENTS

| | | | | |
|---|---|---|---|---|
| 2003/0194126 A1* | 10/2003 | Shin | .................... | G06T 7/90 382/164 |
| 2004/0130546 A1* | 7/2004 | Porikli | .................... | G06K 9/342 345/423 |
| 2016/0171954 A1* | 6/2016 | Guo | .................... | G06T 7/60 345/589 |
| 2019/0279402 A1* | 9/2019 | Panetta | .................... | G06T 7/10 |
| 2020/0286151 A1* | 9/2020 | Jain | .................... | H04N 21/278 |
| 2020/0410955 A1* | 12/2020 | Walker | .................... | G09G 5/06 |
| 2021/0103969 A1* | 4/2021 | Sollami | .................... | G06N 3/08 |

* cited by examiner

*Primary Examiner* — Wesner Sajous
(74) *Attorney, Agent, or Firm* — Nicholson De Vos Webster & Elliott LLP

(57) ABSTRACT

Embodiments are disclosed for identify a proportional dominant color palette of a vector graphics content and recolor the vector graphics content by editing the proportional dominant color palette. In particular, one method comprises obtaining a vector graphic, determining, by a palette extraction manager, a plurality of colors from the vector graphic, grouping, by the palette extraction manager, the plurality of colors into a plurality of groups based on color characteristics, determining, by the palette extraction manager, a plurality of dominant colors corresponding to the plurality of groups based on a subset of the plurality of colors associated with each group, determining, by the palette extraction manager, a plurality of weights corresponding to the plurality of colors, and generating, by the palette extraction manager, a proportional dominant color palette for the vector graphic based on the plurality of dominant colors and the corresponding plurality of weights.

17 Claims, 11 Drawing Sheets
(3 of 11 Drawing Sheet(s) Filed in Color)

GENERATING AND ADJUSTING A PROPORTIONAL PALETTE OF DOMINANT COLORS IN A VECTOR ARTWORK

BACKGROUND

Technical Field

The present disclosure relates generally to systems and method for editing vector graphics. More specifically, one or more embodiments of the present disclosure relate to systems and methods for generating and adjusting proportional palette of dominant colors in a vector graphic.

Background and Relevant Art

Conventional computer graphic systems enable users to create various types of computer graphics content such as free form illustration, engineering design, or other types of technical or non-technical computer graphics. The computer graphics content created by the designer often includes many colors which form the color palette of the content. The color palette in use greatly affects how the content is received by a viewer. For example, the mood of the content being designed varies dramatically depending on the colors in the color palette, the proportion of colors in the color palette, etc. Today, for a designer to find this color palette and define its proportions, is a manual process that relies on the specialized knowledge, experience, and judgment of the designer. Additionally, because there are so many colors available (e.g., in the RGB color space a computer system defines approximately $16 \times 10^6$ colors), it is very difficult even for experienced designers to make an average color palette which accurately represents their artwork.

These and other problems exist with regard to editing graphics in electronic systems.

SUMMARY

Introduced here are techniques/technologies that enable a color proportional dominant color palette to be generated from a vector-based graphic. The proportional dominant color palette enables a user to quickly recolor the vector-based graphic, by changing one or more dominant colors in the proportional dominant color palette and/or by changing the proportions associated with one or more of the dominant colors in the palette. In particular, in one or more embodiments, the disclosed systems and methods comprise extracting the colors from a vector graphic. The colors are then groups based on similarity. For example, if colors are grouped by hue, then colors that are shades or tints of one other are grouped together. These color groups are then used to identify a dominant color for each group. For example, in some embodiments, the dominant color of a particular group is a median color along the metric on which the colors were grouped. As such, the dominant color of a given group does not necessarily appear in the vector graphic. The vector graphic is then rasterized, and the pixel colors are used to determine a weight associated with each dominant color. Once the weights have been determined, a proportional dominant color palette is generated which represents the dominant colors of the vector graphic and their relative prevalence in the vector graphic.

The proportional dominant color palette enables a user to recolor a given vector graphic. For example, if the user makes changes the proportions of the dominant colors of the proportional dominant color palette, then the content is recolored not by changing any particular dominant color but by changing the proportions of the existing colors. In some embodiments, this involves mapping colors between the original color palette distribution and the updated color palette distribution. Additionally, or alternatively, in some embodiments, is also enabled to change the color of a dominant color (or multiple dominant colors). The content is then recolored based on this change using relative color characteristics that were determined when the dominant colors were identified.

Additional features and advantages of exemplary embodiments of the present disclosure will be set forth in the description which follows, and in part will be obvious from the description, or are learnable by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which.

DETAILED DESCRIPTION

Figure 1:
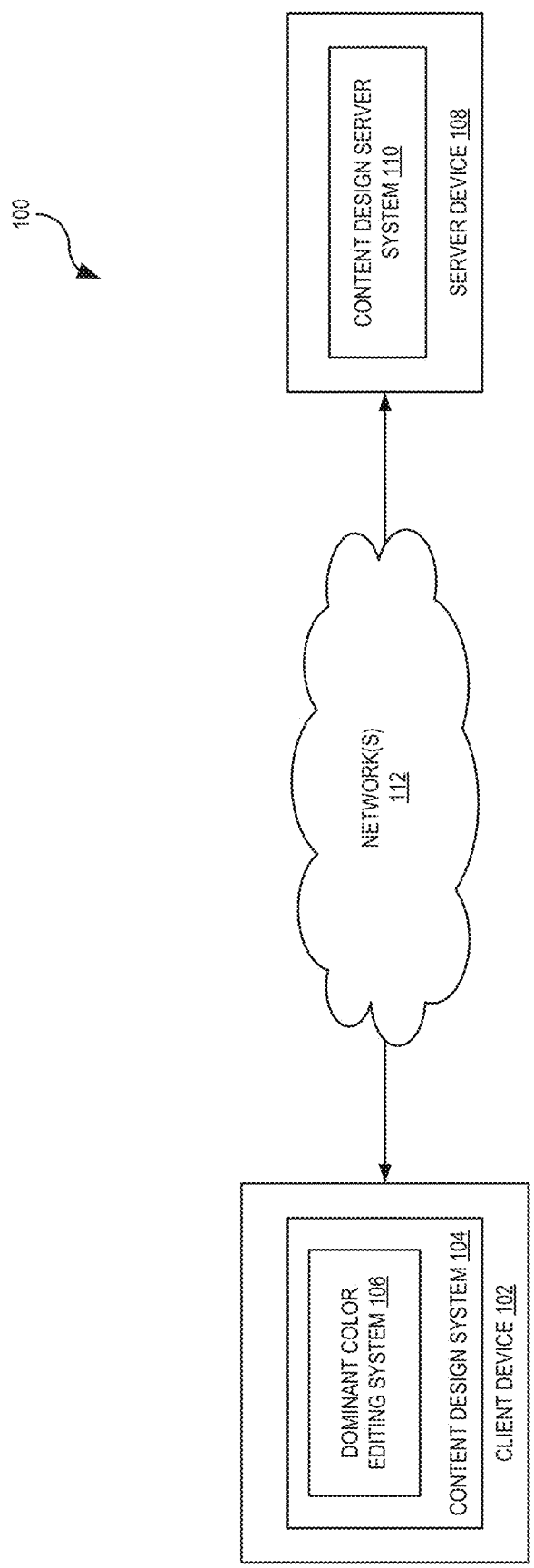
FIG. 1 illustrates a schematic diagram of an exemplary environment in which a content design system is implemented in accordance with one or more embodiments.

One or more embodiments of the present disclosure include a content design system that enables users to identify a proportional dominant color palette of a vector graphics content and recolor the vector graphics content by editing the proportional dominant color palette. As discussed, the color palette of a given artwork greatly affects how that artwork is perceived by its audience. Designers often want to explore different variations of artwork by modifying the proportion of colors or changing colors in their artwork. For example, changes in proportion of colors enables a designer to create multiple variations of a vector graphics content artworks while keeping the same colors. Likewise, the designers often wish to change the dominant colors of their content to create different colored variations of their designs (e.g., to adapt their design to regional or cultural color preferences or to create other variations).

Existing content design systems enable users to manually select artwork with different fills and recolor the selected fills, such as through a recolor dialog window. However, it is still time consuming when it comes to recoloring a very complex artwork which includes a very large number of colors. For example, one existing option for recoloring is for the designer to manually select color handles to change the corresponding colors in their design. This is both tedious and open to significant error. Additionally, without expertise in color theory, the designer is left with trial and error to find a new color or multiple colors that achieve their desired result. Additionally, deep learning techniques exist for recommending a color palette to the designer. However, these techniques base their recommendations on the past designs by that designer, and do not enable a proportional dominant color palette of a vector graphics content under inspection to be identified or modified.

Unlike past systems, embodiments automatically extract dominant colors and determine their proportions in an input vector graphics content. In some embodiments, dominant colors are determined by grouping similar colors together based on input parameters from the designer (e.g., tone, hue, brightness, saturation, temperature etc.). In some embodiments, colors in a vector graphics content are grouped based on hue. If a color is determined to be a shade or tint of a color that has already been processed, then it is grouped with that color. If not, then a new group is created. Once the colors have been grouped, the dominant color of each group is identified (e.g., a median color, weighted mean color, color occupying the largest area of the content, etc.). Once the dominant colors of the vector graphics content are identified, a proportional color palette is determined by weighting each dominant color based on its prevalence in the content. For example, in some embodiments, the weight is determined by rasterizing the vector graphics content and incrementing the weight of each dominant color based on the number of pixels corresponding to each dominant color.

Once the proportional dominant color palette has been identified, the proportional dominant color palette is usable by the designer to recolor their content. For example, in some embodiments the content is recolored according to changes the proportions of the dominant colors of the proportional dominant color palette. As such, the content is recolored not by changing any particular dominant color but by changing the proportions of the existing colors. Additionally, or alternatively, in some embodiments, the designer selects a dominant color (or multiple dominant colors) of the proportional dominant color palette and changes the dominant color to a different color. The content is then recolored based on this change. For example, the tint/shade values determined when the colors were grouped are applied to the new dominant color, automatically recoloring the corresponding portions of the vector graphics content.

Term Definitions

As described above, the content design system extracts various characteristics from a source vector graphic. As used herein, the "characteristics" of a vector graphic include a variety of information related to an image. For example, an image's color characteristics include the color palette represented in the image. The image's color characteristics further include, in some embodiments, hue, tone, brightness, saturation, temperature, etc. Additionally, characteristics associated with an image include, but are not limited to, hue, saturation, opacity, luminosity, color grading, image sharpness, and so forth.

As used herein, a "vector graphic" includes a collection of one or more path objects (or "paths"). A path object is a combination of linked Bezier curves which are used to model curves, lines, and other shapes. A given path generally includes reference points, sometimes referred to as endpoints or anchor points. Specifically, an anchor point is either of the two endpoints of a Bezier curve. These reference points allow a user to interact with a vector graphic.

As used herein, "planarizing" a vector graphic (e.g., one or more path objects) includes reducing a set of overlapping path objects to a non-overlapping set of path objects. For example, planarizing a vector graphic having a first path object overlapping a second path object involves creating a modified version of the vector graphic, where the modified version of the vector graphic includes, in a single layer, the first path object and a modified version of the second path object in which the obscured portion of the second path object is removed.

As used herein, a "color palette" includes a set of colors that occur within a given vector graphic. A "dominant color palette" is a color palette that includes dominant colors to represent the set of colors that occur within the vector graphic. A "proportional dominant color palette" is a dominant color palette that also includes with weights indicating respective prominence of the dominant colors within the color palette (e.g., how much of the graphic includes content having a color associated with a particular dominant color).

Referring now to the figures, FIG. 1 illustrates a schematic diagram of an exemplary environment 100 within which a dominant color editing system 106 (or simply "editing system" 106) operates. In one or more embodiments, the exemplary environment 100 includes a client device 102, a server device 108, and one or more networks 112. The network(s) 112 include any suitable network over which the computing devices communicate. Example and features of computing devices (e.g., the client device 102 and the server device 108) and networks (e.g., network(s) 112) are discussed in more detail below with regard to FIGS. 10-11.

As illustrated in FIG. 1, the environment 100 includes the client device 102 having a content design system 104 as well as the editing system 106. The content design system 104 generally facilitates the creation, modification, sharing, and/or deletion of graphical content including vector-based content. In one or more embodiments, the content design system 104 is a design application such as ADOBE® ILLUSTRATOR®. In other embodiments, the content design system 104 includes multiple applications, functions, and operations relating to graphical content, such as an application suite, a web-based application, and/or system operations on the client device 102.

As shown in FIG. 1, the content design system 104 includes the editing system 106. In some embodiments, however, the editing system 106 is located on the client device apart from the content design system 104. As mentioned above, and as is explained in detail below, the editing system 106 identifies a proportional dominant color palette of an input vector graphic. The proportional dominant color palette indicates a plurality of dominant colors associated with the vector graphic and the relative prevalence of each dominant color in the vector graphic. As also described previously, the editing system enables vector-based content to be recolored more efficiently than conventional systems based on changes made to the proportional dominant color palette. Additional detail regarding the editing system 106 is provided below with respect to subsequent figures.

In addition, the environment 100 includes the server device 108. The server device 108 generates, stores, receives, and/or transmits any type of data, including graphical content. As shown, the server device 108 includes a content design server system 110 that communicates with the content design system 104 on the client device 102. For example, the content design server system 110 transmits graphical content to the client device 102, which enables the client device 102 to edit the dominant color of the graphical content (e.g., proportionally adjust the dominant colors, edit the hues of dominant colors, etc.). Notably, while only a single server device is shown, the content design server system 110 is implemented across multiple server devices.

While not illustrated, in one or more embodiments, the server device 108 includes all, or a portion of, the editing system 106, such as within the content design server system 110. For example, when located in the server device 108, the editing system 106 comprises an application running on the server device 108 or a portion of a software application that is downloaded to the client device 102. For instance, the editing system 106 includes a web hosting application that allows the client device 102 to interact with content from the content design server system 110 hosted at the server device 108. In this manner, the server device 108 performs dominant color editing in vector-based content based on inputs received from a designer using client device 102.

Figure 2:
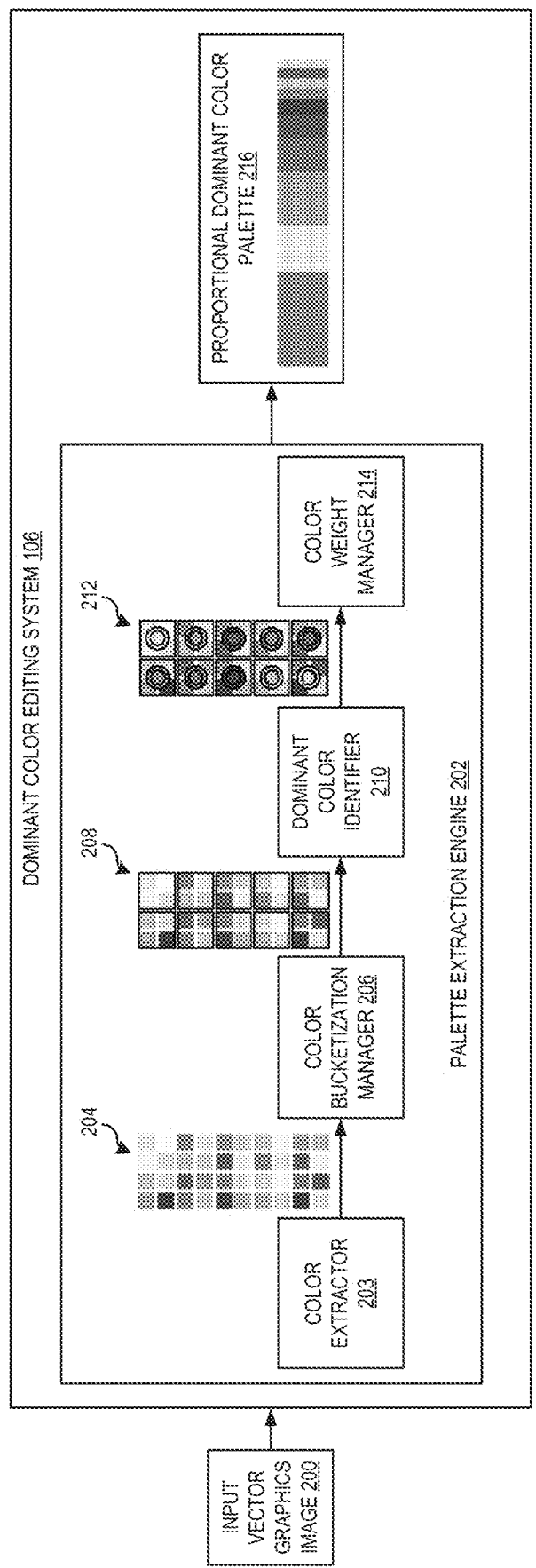
FIG. 2 illustrates a diagram of a dominant color editing system in accordance with one or more embodiments.

FIG. 2 illustrates a diagram of a dominant color editing system in accordance with one or more embodiments. As shown in FIG. 2, the user provides an input vector graphic 200 to dominant color editing system 106. In some embodiments, the user selects a user interface element associated with dominant color editing system 106 shown in a user interface provided by content design system 104. Once selected, the vector graphic 200 currently being edited in content design system 104 is then provided to dominant color editing system 106. In some embodiments, the input vector graphic 200 is a vector graphic created by the user in content design system 104. Additionally, or alternatively, in some embodiments, the user opens an existing vector graphic using content design system 104 and sends a request to dominant color editing system 106 to determine a proportional dominant color palette for the input vector graphic 200.

The dominant color editing system 106 includes palette extraction engine 202. In some embodiments, the color update engine 612 uses the palette extraction engine 202 to extract a proportional dominant color palette from the input vector graphic 200. A palette-extraction process involves identifying unique colors of the input vector graphic 200, grouping the colors, and identifying a dominant color for each group. Examples of identifying unique colors include identifying pixel values of a graphic as rendered, identifying fill colors of a vector graphic, identifying discrete colors used to define a gradient in a vector graphic, or some combination thereof. A palette-extraction process also involves identifying respective weights of the dominant colors in the palette.

As shown, palette extraction engine 202 include color extractor 203 to extract a set of colors 204 from the input vector graphic 200. The color extractor 203 references various color parameters (e.g., stroke color, fill color, etc.) to identify or derive color information for the path objects in a given vector graphic. In one example, the color extractor 203 identifies the color of an object having a solid color by referencing a fill color. In another example, the color extractor 203 derives one or more colors of an object having a shading construct by referencing various parameters of the shading construct (e.g., stop colors) and computing the resulting color information that would be displayed in the rendered vector graphic.

In some embodiments, the color extractor 203 planarizes the input vector graphic 200 to reduce any overlapping path objects in the vector graphic into a set of non-overlapping path objects (also referred to as planarized segments). For instance, the input vector graphic could include a first path (e.g., a first shape) in a first layer and a second path (e.g., a second shape) in a second layer having a portion that is positioned below the first path, such that a portion of the second path is obscured. In some embodiments, planarizing such a vector graphic involves creating a modified version of the vector graphic, where the modified version of the vector graphic includes, in a single layer, the first path and a modified version of the second path in which the obscured portion of the second path is removed. Planarizing the input vector graphic removes, from consideration by the palette-extraction process, color data for obscured regions of a multilayer graphic, thereby resulting in a more accurate identification of colors and associated weights for a color palette. For instance, if portion of a particular path is not visible to a viewer when a vector graphic is rendered, then a color that only occurs in that obscured portion should be excluded from the resulting proportional dominant color palette and/or the obscured portion of the path should not be considered when determining the weight of a dominant color associated with that color. Once the set of non-overlapping path objects of the vector graphic 200 is obtained, then the color(s) of each path object is determined. For solid fill objects, the color associated with the fill is recorded. For more objects having a complex color type, such as pattern fill, gradient fill, texture fill, etc. the colors associated with the complex color types are recorded based on parameters associated with those complex color types (e.g., color stops, etc.).

Once the colors present in the input vector graphic 200 have been identified, the set of colors 204 is provided to color bucketization manager 206. Color bucketization manager 206 groups the set of colors 204 based on similarity of color characteristics. In some embodiments, the color characteristics include hue, tone, brightness, saturation, temperature, etc. For example, when bucketized by tone, the color bucketization manager groups the set of colors 204 into a plurality of buckets 208. The color bucketization manager iteratively evaluates each color from the set of colors 204 to determine whether a color is a tone of any other color that has already been processed. For example, the first color processed is added to a newly created bucket. The second color is then processed and the color bucketization manager 206 determines whether the second color is a shade or tint of the first color (e.g., whether the second color is obtainable from the first color by adding black or white to the first color). If the second color is a tint or shade of the first color, then it is added to the bucket with the first color. If the second color is not a tint or shade of the first color, then a second bucket is created, and the second color is added to the second bucket. This process continues until all colors in the set of colors 204 have been processed.

Once the set of colors 204 has been bucketized into a plurality of buckets 208, the bucketized set of colors is provided to dominant color manager 210 to identify a dominant color of each bucket. In some embodiments, the dominant color of a given bucket is the color from that bucket covering the largest area of the input vector graphic 200. Alternatively, the median color value of the bucket is identified as the dominant color. For example, if the colors in a bucket are sorted by shade and tint values, then the median shade or tint value is used to obtain the dominant color. In some embodiments, the color in the bucket closest to the median value is selected as the dominant color. Alternatively, the median color is the dominant color even if this color does not appear in the input vector graphic 200. Once the dominant color of each group has been identified, the dominant color identifier calculates a relative color characteristic value between the dominant color and each color in that dominant color's group. For example, in embodiments where the colors are grouped by tone, the shade or tint value relative to the dominant color is stored. These values are useful later when editing a vector graphic by making changes to the dominant color palette.

The resulting set of dominant colors 212 and the input vector graphic 200 are then provided to the color weight manager 214. Color weight manager 214 determines a weight associated with each dominant color in the input vector graphic 200. In some embodiments, the color weight manager 214 rasterizes the input vector graphic 200. For each pixel in the raster image, the color weight manager determines the closest dominant color to the color of the pixel and increments a weight associated with that dominant color. In some embodiments, the color weight manager then determines the weights associated with each dominant color by normalizing the weights. For example, in some embodiments, the weights are normalized such that the dominant color weights all fall between zero and 1. Alternatively, the weights are normalized such that the weights add up to 100 (or 10, 1, or other fixed value). Using the resulting dominant color weights, proportional dominant color palette 216 is generated, where the width of each dominant color corresponds to the weight associated with that dominant color.

Figure 3:
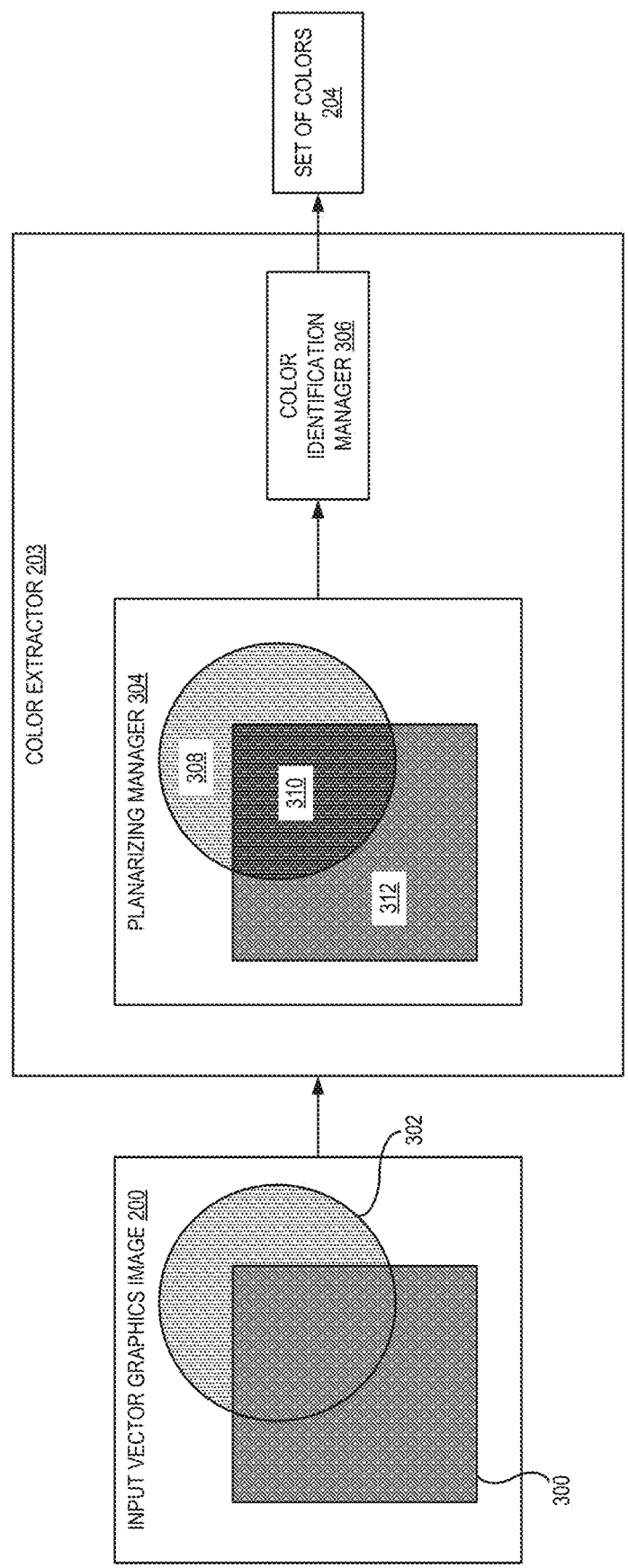
FIG. 3 illustrates a diagram of a dominant color editing system in accordance with one or more embodiments.

FIG. 3 illustrates a diagram of a dominant color editing system in accordance with one or more embodiments. As shown in FIG. 3, input vector graphic 200 includes two path objects 300 and 302. The embodiment shown in FIG. 3 is simplified for the purposes of explanation. In various embodiments, the input vector graphic 200 is of greater or simpler complexity. As discussed, the input vector graphic 200 is provided to color extractor 203. Color extractor 203 includes a planarizing manager 304 and a color identification manager 306.

The planarizing manager 304 is configured to detect any vector object (e.g., objects 300 and 302) whose bounding boxes intersect. In particular, at least some of the input vector graphic 200 is segmented into smaller shapes at dividing lines that are provided by an upper shape that completely cross an underlying shape. For example, as shown in FIG. 3, vector objects 300 and 302 are divided into planar segments 308, 310, and 312 which are identified based on where objects 300 and 302 intersect. This selective dividing process effectively removes overlap where appropriate so as to effectively place all resulting shapes into the same planar surface and thereby eliminating the need for a stacking order.

The resulting set of non-overlapping path objects 308-312 of the vector graphic 200 is then provided to color identification manager 306. Color identification manager 306 identifies the color(s) of each path object 308-312. For example, for solid fill objects, the color associated with the fill is recorded. For more objects having a complex color type, such as pattern fill, gradient fill, texture fill, etc. the colors associated with the complex color types are recorded. Each color is added to the set of colors 204 as it is identified by color identification manager 306.

Figure 4:
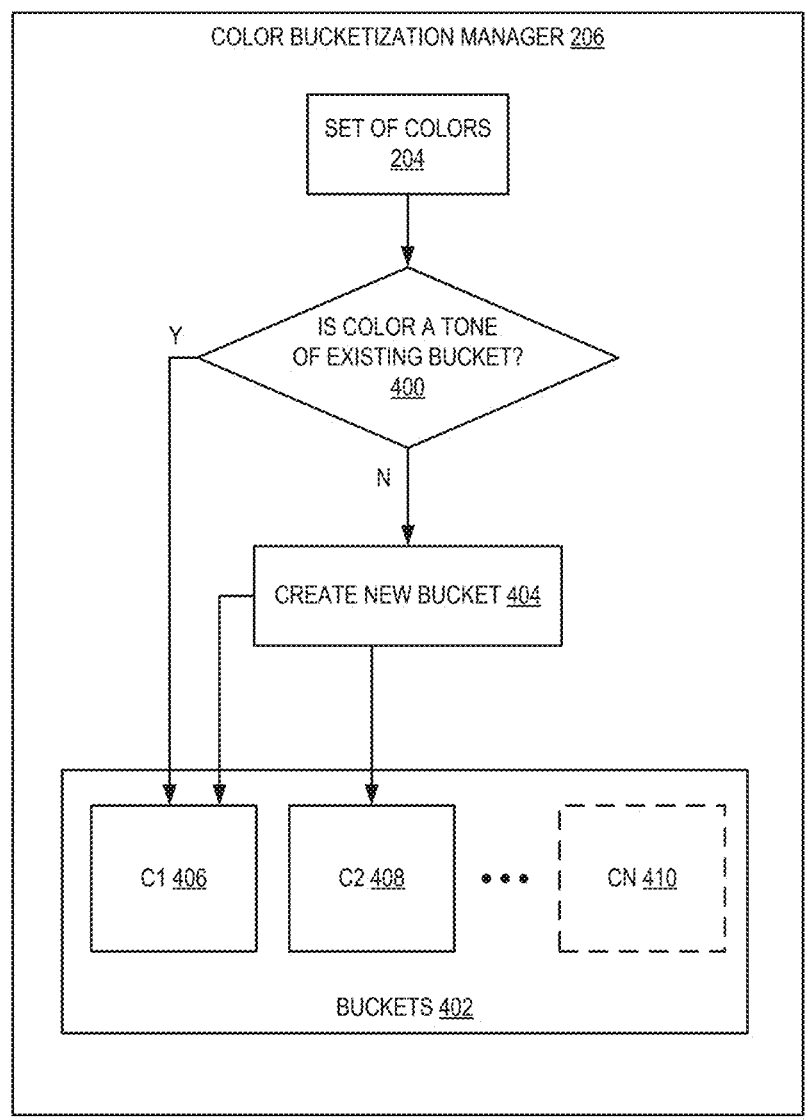
FIG. 4 illustrates a diagram of grouping colors in accordance with one or more embodiments.

FIG. 4 illustrates a diagram of grouping colors in accordance with one or more embodiments. As shown in FIG. 4, the color bucketization manager 206 receives the set of colors 204 generated by color extractor 203, as discussed above. The color bucketization manager 206 iteratively processes each color from the set of colors 204 to identify groups (e.g., buckets) of colors that share similar color characteristics. For example, for a first color from the set of colors, the color bucketization manager 206 determines whether the first color is a tone of an existing bucket 400. As this is the first color being processed, there are no existing buckets in the set of buckets 402, therefore the color bucketization manager creates 404 a new bucket C1 406 and adds the first color to bucket C1 406. Although the example of FIG. 4 is discussed with respect to grouping colors according to tone, in various embodiments other color characteristics such as hue, brightness, saturation, temperature, etc. are used to perform this grouping.

The next color is then retrieved from the set of colors 204 and the process repeats, until all colors from the set of colors 204 have been processed. For example, if the second color is a tone of an existing bucket (e.g., in this example C1), then it is added to the existing bucket. If the second color is not a tone of an existing bucket, then the color bucketization manager 206 creates 404 another bucket C2 408. This continues until all colors have been processed and results in creating one or more buckets (e.g., buckets C1 406 to CN 410).

In some embodiments, to determine whether a color is a tone of another color that has already been processed, the color bucketization manager 206 determines whether the color is a tint or shade of a previously processed color. For example, a color C, with RGB component R, G, B, is a tint of another color C' with RGB components R', G', B' if f ∃ a value (T) 0<T<1 such that:

$$R=R'+(255-R')*T$$

$$G=G'+(255-G')*T$$

$$B=B'+(255-B')T$$

Similarly, a color C, with RGB component R, G, B, is a shade of another color C' with RGB components R', G', B' if f ∃ a value (S) 0<S<1 such that:

$$R=R'*(1-S)$$

$$G=G'*(1-S)$$

$$B=B'*(1-S)$$

Let C be the color currently being processed by color bucketization manager 206, and C' be a previously processed color, each with RGB components of R, G, B and R', G', B', respectively. Then the color bucketization manager 206 determines whether C' is a shade or tint of C. For example, if R≥R' and G≥G' and B≥B', then it is possible that C' is a tint of C. Otherwise, if R<R' and G<G' and B<B', then it is possible that C' is a shade of C. If neither of the above is true, then C' is neither a tint or shade of C, and a new bucket is added to buckets 402 and color C is added to the new bucket.

If it is possible that C' is a tint of C, then the color bucketization manager 206 calculates the $T_R$, $T_G$, $T_B$ values along each component axis. If $T_R \cong T_G \cong T_B$ within a tolerance value, then C' is a tint of C with a tint value $T_C$ equal to the average of $T_R$, $T_G$, $T_B$. The color C is then added to the bucket associated with C' and the tint value $T_C$ associated with C is stored. If $T_R$ $T_G$ $T_B$ within the tolerance value, then then C' is neither a tint or shade of C, and a new bucket is added to buckets 402 and color C is added to the new bucket.

If it is possible that C' is a shade of C, then the color bucketization manager 206 calculates the $S_R$, $S_G$, $S_B$ values along each component axis. If $S_R \cong S_G \cong S_B$ within a tolerance value, then C' is a tint of C with a tint value $S_C$ equal to the average of $S_R$, $S_G$, $S_B$. The color C is then added to the bucket associated with C' and the tint value $S_C$ associated with C is stored. If $S_R$ $S_G$ $S_B$ within the tolerance value, then then C' is neither a tint or shade of C, and a new bucket is added to buckets 402 and color C is added to the new bucket. In some embodiments, the tolerance value for tints and shades is the same. Alternatively, the tolerance value for tints and the tolerance value for shades are different values.

Figure 5:
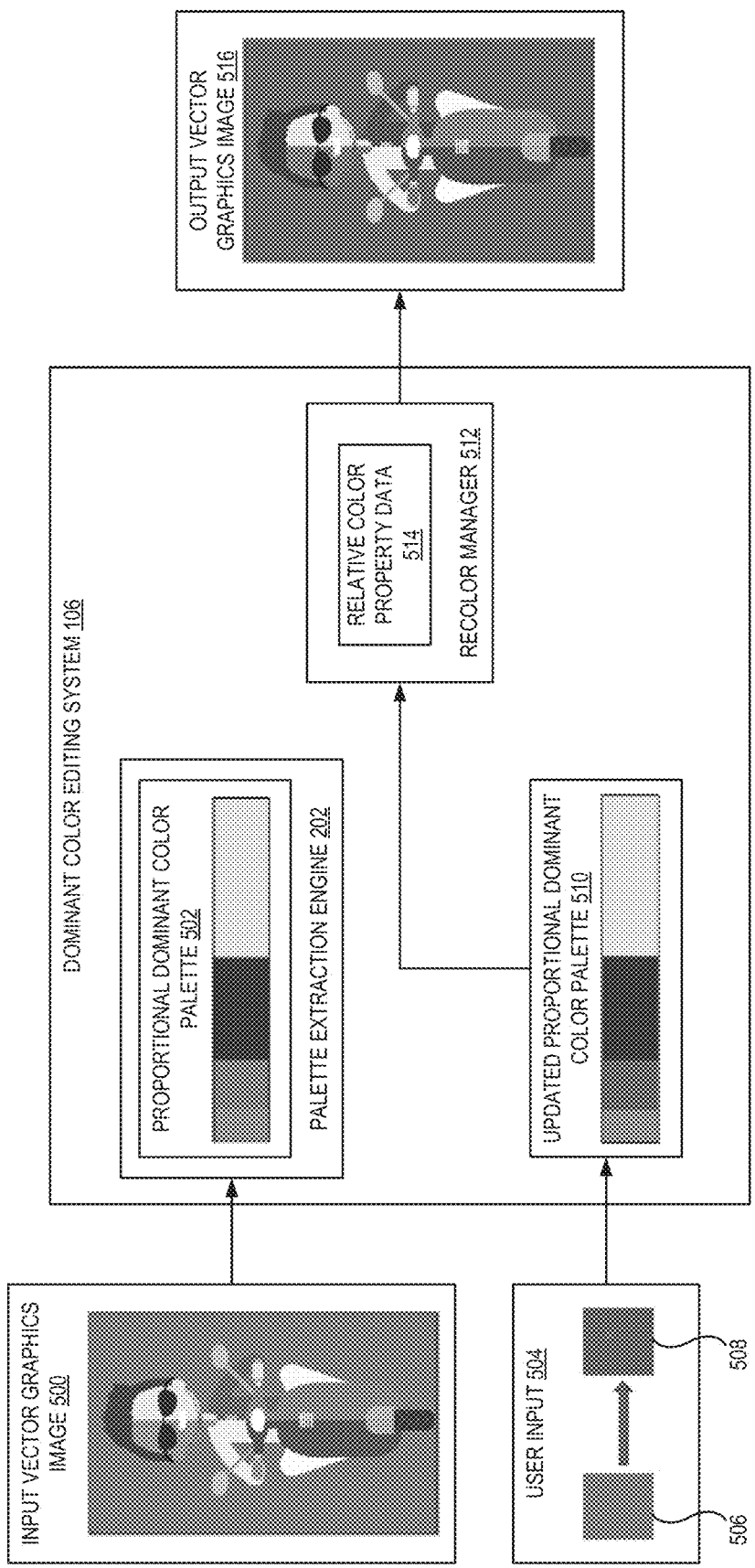
FIG. 5 illustrates a diagram of recoloring a vector graphic by editing the proportional dominant color palette in accordance with one or more embodiments.

FIG. 5 illustrates a diagram of recoloring a vector graphic by editing the proportional dominant color palette in accordance with one or more embodiments. As shown in FIG. 5, a user provides an input vector graphic 500 to dominant color editing system 106. As discussed above, the user provides the vector graphic to the dominant color editing system 106 in a variety of ways, such as selecting a pre-existing vector graphic stored locally on the user's electronic device or remotely in a storage service or other remote data store. In some embodiments, the input vector graphic 500 is a portion of the user's current canvas/workspace in a content design application. For example, the user selects a subset of objects in the canvas/workspace to be analyzed by the dominant color editing system. As discussed, the dominant color editing system then generates a proportional dominant color palette 502 for the input vector graphic 500 (or portions thereof).

Once the proportional dominant color palette 502 has been generated for the input vector graphic 500, the user is then able to edit the proportional dominant color palette 502 to make changes to the vector graphic 500. For example, the user provides user input 504 to change a first dominant color 506 to a second color 508. In some embodiments, the user specifies a new RBG value for the new color 508. In some embodiments, the user maps a selected dominant color to a new color via a graphical user interface element, such as a color wheel, color selector, etc. This results in an updated dominant color palette 510 in which the selected color 506 has been replaced with new color 508. The updated proportional dominant color palette 510 is received by recolor manager 512 which then uses input color characteristic data 514 to generate recolored output image 516.

As discussed, once the dominant colors have been identified, the colors of a particular vector graphic are grouped according to similarity of color characteristics. For example, where the colors are grouped according to tone, the dominant color editing system determines colors that are tints or shades of one another and groups these colors accordingly. A dominant color is then determined for each group based on its included colors. As discussed, the dominant color editing system 106 determines a color characteristic value for each color in a group relative to the dominant color. For example, where the colors are grouped according to tone, each color in a group is associated with a tint or shade value (e.g., T or S, described above). The tint or shade value associated with a given color is usable to obtain that color from the dominant color's RGB values.

Accordingly, these relative color characteristics enable the recolor manager to recolor each color in the group associated with the updated dominant color. For example, if a first color in a group is a tint of that group's dominant color, then the first color is:

$$R = R_D + (255 - R_D) * T$$

$$G = G_D + (255 - G_D) * T$$

$$B = B_D + (255 - B_D) * T$$

where $R_D$, $G_D$, $B_D$ are the RGB components of the dominant color D, T is the tint value associated with the first color, and R, G, B are the RGB components of the first color. Accordingly, if dominant color is changed to D', then the tint value T is used with the RGB components of the new dominant color to obtain the recolored color value of the first color. For example, the new RGB components R', G', B' become:

$$R' = R_{D'} + (255 - R_{D'}) * T$$

$$G' = G_{D'} + (255 - G_{D'}) * T$$

$$B' = B_{D'} + (255 - B_{D'}) T$$

where $R_{D'}$, $G_{D'}$, $B_{D'}$, are the RGB components of new dominant color D' Similarly, if a second color in a group is a shade of that group's dominant color, then the color is:

$$R = R_D * (1 - S)$$

$$G = G_D * (1 - S)$$

$$B = B_D * (1 - S)$$

where $R_D$, $G_D$, $B_D$ are the RGB components of the dominant color D, S is the shade value associated with the second color, and R, G, B are the RGB components of the second color. Accordingly, when the dominant color is changed to D', then the shade value S is used with the RGB components of the new dominant color to obtain the recolored color value of the second color. For example, the new RGB components R', G', B' of the second color become:

$$R' = R_{D'} * (1 - S)$$

$$G' = G_{D'} * (1 - S)$$

$$B' = B_{D'} * (1 - S)$$

These transforms are applied to each color in the group associated with the dominant color that has been changed to recolor the input image 500 to output image 516.

Figure 6:
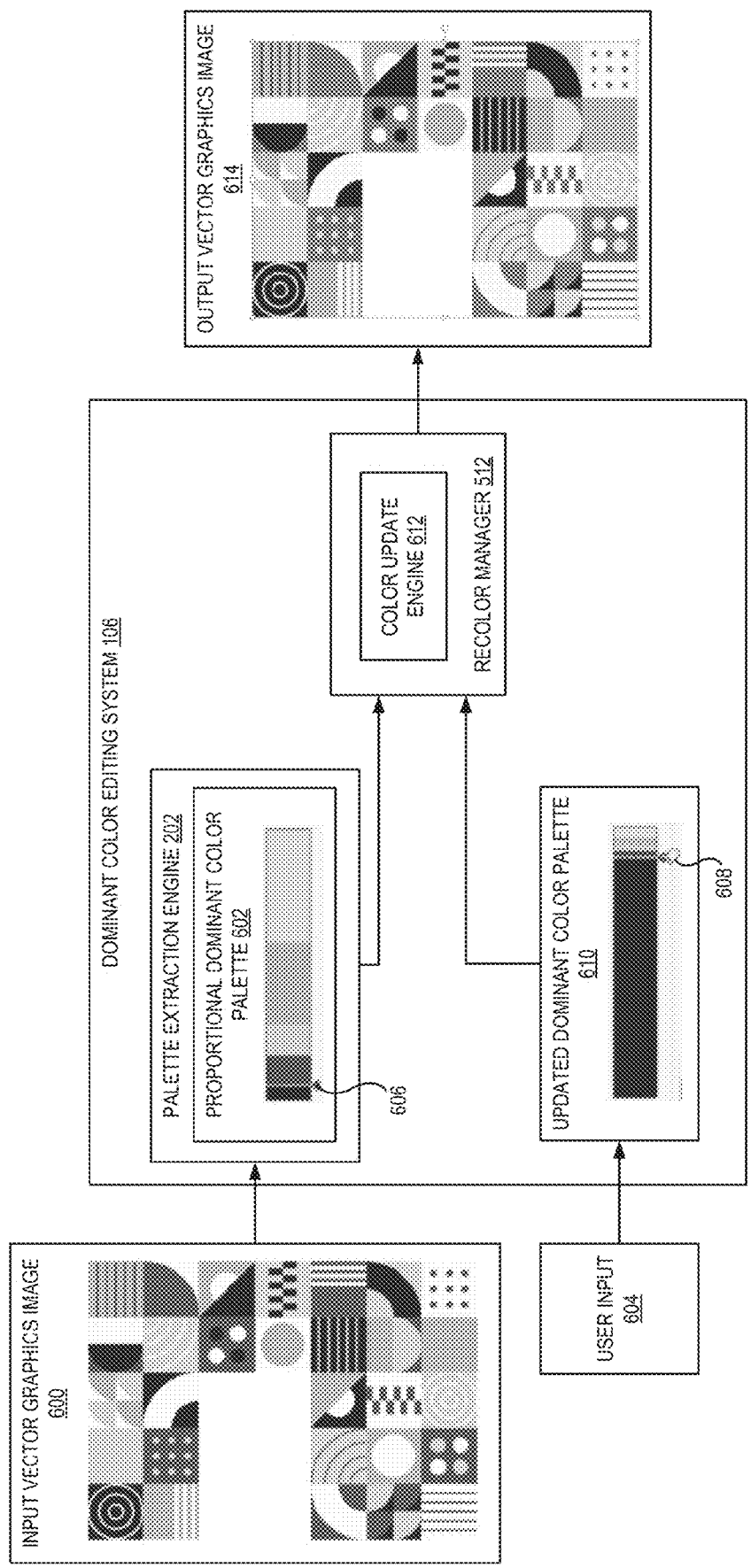
FIG. 6 illustrates a diagram of recoloring a vector graphic by editing the proportional dominant color palette distribution in accordance with one or more embodiments.

FIG. 6 illustrates a diagram of recoloring a vector graphic by editing the proportional dominant color palette distribution in accordance with one or more embodiments. As shown in FIG. 6, a user provides an input vector graphic 600 to dominant color editing system 106. As discussed, the dominant color editing system then generates a proportional dominant color palette 502 for the input vector graphic 500 (or portions thereof).

Once the proportional dominant color palette 602 has been generated for the input vector graphic 600, the user is then able to edit the proportional dominant color palette 602 to make changes to the vector graphic 600. For example, the user provides user input 604 to change the proportions of the dominant colors in the proportional dominant color palette 602. In some embodiments, the user interacts with a graphical user interface element, such as a draggable element 606 associated with one of the dominant colors. In some embodiments, the draggable element (or other interactive GUI element) is displayed upon selection of the dominant color to be edited or as a result of the user hovering a cursor over a particular dominant color. Alternatively, the draggable element is always displayed for each dominant color. The user then drags the draggable element to a new position 608, resulting in an updated dominant color palette 610 in which the proportion of the selected dominant color has been increased and the other dominant colors have been decreased. The updated proportional dominant color palette 610 is received by recolor manager 512 which then uses color update engine 612 to generate recolored output image 614.

For instance, the color update engine 612 performs one or more operations that generate a mapping between a source proportional dominant color palette of the input vector graphic 600 and an updated dominant color palette distribution 610 that has been modified by user input 604, as discussed above. Such a mapping indicates, for example, that a first color from the input vector graphic 600 is mapped to a second color from the output vector graphic 614. The color update engine 612 uses the mapping to modify color information (e.g., pixel data, "fill" color, etc.) for an object from the output vector graphic 614. For instance, if an object in the output vector graphic 614 has the second color, and the second color is mapped to the first color from the input vector graphic 600, the color update engine 612 generates a recolored output vector graphic 614 by updating the object in the output vector graphic 614 to have the second color.

In some embodiments, the color update engine 612 generates a mapping by determining parameters of a transfer function. The transfer function indicates how to transform a distribution of colors found in the input vector graphic 600 into a distribution of colors found in the output vector graphic 614. A distribution of colors includes colors from a graphic's color palette (e.g., colors defining a color theme depicted in the graphic) and associated proportion of the colors. For example, a density for a particular dominant color in a graphic could be a proportion of the graphic, as rendered, that includes that colors associated with that dominant color. The color update engine 612 computes parameters of the transfer function by modeling, as a flow-optimization problem, the transformation of the input's proportional dominant color distribution into the updated proportional dominant color distribution. Solving the flow-optimization problem involves determining flows from source colors to target colors, e.g., determining which weighted combinations of source colors result in a given target color, or vice versa.

In some embodiments, generating a recolored output vector graphic involves modifying a copy of the input vector graphic used in a preview function of the content design system.

In some embodiments, once the user input is received, the recolor manager 512 obtains the original proportional dominant color palette 602 and the updated dominant color palette 610 and provides them to color update engine 612 to compute a palette flow that maps colors of the original proportional dominant color palette 602 to colors of the updated dominant color palette 610. For instance, the color update engine 612 determines parameters of a transfer function that maps a distribution of colors in the output graphic to a distribution of colors in the input graphic.

In some embodiments, a palette flow includes flows that are computed based on an amount of work required to transform a color distribution of the original proportional dominant color palette 602 into a source color distribution of the updated proportional dominant color palette 610. For instance, computing the palette flow could involve minimizing an earth-mover distance between a color distribution of the original proportional dominant color palette 602 and a color distribution of the updated proportional dominant color palette 610. Computing an earth-mover distance involves computing the amount of work required to change the input color distribution into the output color distribution. For instance, the work contributed to the earth-mover distance by an input color and an output color is modeled as a movement of a certain amount of mass along a distance between a first point in a color space, such as a first set of L*a*b* color space values defining an input color, and a second point in the color space, such as a second set of L*a*b* color space values defining an output color. In this scenario, the modeled "mass" is referred to as a "flow" between the input color, which is defined by the first set of L*a*b* color space values, and the output color, which is defined by the second set of L*a*b* color space values.

A palette flow includes a set of these flows that are computed using the earthmover distance. Certain flows between a given input color and multiple output colors are used to compute a weighted combination of the output colors that are usable to replace the input color. Using the earth-mover distance, in some cases, results in improved coherence being maintained after a color transfer, and also adds robustness in cases where there is a large difference between the distribution of colors within the output graphic color distribution and the distribution of colors within the input graphic. Thus, certain embodiments using this type of flow computation generate recolored vector graphics that have a high aesthetic quality.

In one example, the color update engine 612 minimizes an earth-mover distance subject to one or more constraints. Examples of these constraints include requiring a sum of flows for a color in the original proportional dominant color palette 602 to be less than or equal to a weight of the color in the input color distribution, requiring a sum of flows for an output color in the updated proportional dominant color palette 610 to be less than or equal to a weight of the output color in the output color distribution, or some combination thereof.

Additionally, or alternatively, in some embodiments, minimizing the earth-mover distance involves minimizing an objective function. For example, each color palette used includes a set of colors that occur within the graphic, along with weights indicating respective proportions of the colors within the color palette (e.g., how much of the graphic includes content having a particular color). The color update engine 612 computes a total weight that is a sum of weights of the colors in the original proportional dominant color palette 602. The color update engine 612 also computes a total weight that is a sum of weights of the colors in the updated proportional dominant color palette 610. The color update engine 612 selects a total flow constraint that is a minimum of the total target weight and the total source weight.

Continuing with this example, color update engine 612 accesses, from a non-transitory computer-readable medium used by the color update engine 612, an objective function. The objective function could include a weighted summation of distances with respect to the colors of the original proportional dominant color palette 602 and the colors of the updated proportional dominant color palette 610, where the distances are weighed by flows with respect to the colors of the original proportional dominant color palette 602 and the colors of the updated proportional dominant color palette 610. For instance, each term of the weighted summation could include a distance that is weighted with a flow, where the distance is a distance between a pair of colors from the original proportional dominant color palette 602 and the updated proportional dominant color palette 610 and the flow is a flow between that pair of colors.

In this example, the color update engine 612 determines, subject to a set of constraints, the flows that minimize the objective function. In some embodiments, the set of constraints includes the sum of flows for the color in the original proportional dominant color palette 602 being less than or equal to the weight of the color in the input color distribution. In some embodiments, the set of constraints also includes the sum of flows for the color in the updated proportional dominant color palette 610 being less than or equal to the weight of the color in the output color distribution. In some embodiments, the set of constraints also includes the sum of the flows with respect to the colors of the original proportional dominant color palette 602 and the colors of the updated proportional dominant color palette 610 being equal to the total flow constraint.

In one example of the embodiment discussed above, $C_T$ and $C_I$ are weighted color distributions of the input graphic (also referred to as a target graphic) and the updated proportional dominant palette (also referred to as a source color palette), respectively. In this example, $C_T$ has m colors with $C_T=(C_{T1}; w_{C_{T1}}), (C_{T2}; w_{C_{T2}}), \ldots (C_{Tm}; w_{C_{Tm}})$, where $C_{Ti}$ is the ith color and $w_{C_{Ti}}$ is the weight of the ith color. Similarly, $C_I$ has n colors with $C_I=(C_{I1}; w_{C_{I1}}), (C_{I2}; w_{C_{I2}}), \ldots, (C_{In}; w_{C_{In}})$, where $C_{Ij}$ is the jth color and $w_{C_{Ij}}$ is the weight of the jth color. (In some embodiments, m=n, but this example is applicable for any values of m, n>0.) The ground distance between $C_T$ and $C_I$ is $D=[d_{D_{Ti},C_{Ij}}]$. The color update engine 612 computes a palette flow $F=[f_{i,j}]$, where $f_{i,j}$ is a flow between target color $C_{Ti}$ and source color $C_{Ij}$.

Continuing with this example, the color update engine 612 computes a palette flow that minimizes a cost. For instance, the color update engine 612 accesses an objective function:

$$\sum_{i=1}^{m}\sum_{j=1}^{n} f_{C_{Ti},C_{Ij}} d_{C_{Ti},C_{Ij}}$$

The color update engine 612 computes flows (i.e., $f_{C_{Ti},C_{Ij}}$ for i=1 . . . m and j=1 . . . n) that minimize this objective function subject to a set of constraints. One of these constraints is represented by the following formula:

$f_{C_{Ti},C_{Ij}} \geq 0, 1 \leq i \leq m, 1 \leq j \leq n$

This constraint requires each flow from a target color to a source color to have a value greater than 0. Another one of these constraints is represented by the following formula:

$$\sum_{j=1}^{n} f_{C_{Ti},C_{Ij}} \leq w_{C_{Ti}}, 1 \leq i \leq m$$

This constraint requires that a sum of flows for a given target color i to be less than a weight for that target color i. Another one of these constraints is represented by the following formula:

$$\sum_{i=1}^{m} f_{C_{Ti},C_{Ij}} \leq w_{C_{Ij}}, 1 \leq j \leq n$$

This constraint requires that a sum of flows for a given source color j to be less than a weight for that source color j. Another one of these constraints is represented by the following formula:

$$\sum_{i=1}^{m}\sum_{j=1}^{n} f_{C_{Ti},C_{Ij}} = \min\left\{\sum_{i=1}^{m} w_{C_{Ti}}, \sum_{j=1}^{n} w_{Ij}\right\}$$

This total flow constraint requires that the sum of all of the flows must be equal to a minimum of a total target weight and a total source weight, where a total target weight $\Sigma_{i=1}^{m} w_{C_{Ti}}$ is a sum of the weights of the colors in the proportional dominant color palette and a total source weight $\Sigma_{j=1}^{n} w_{Ij}$ is a sum of the weights of the colors in the updated dominant color palette.

In this example, a palette flow F is computed by solving this linear optimization problem. The earth-mover distance is defined as the work normalized by the total flow, as represented in the following formula:

$$EMD(P, Q) = \frac{\sum_{i=1}^{m}\sum_{j=1}^{n} f_{C_{Ti},C_{Ij}} d_{C_{Ti},C_{Ij}}}{\sum_{i=1}^{m}\sum_{j=1}^{n} f_{C_{Ti},C_{Ij}}}$$

In some embodiments, solving the linear optimization problem involves computing one or more sets of flows between the colors of the updated dominant color palette and one or more target color of the proportional dominant color palette that minimize the earth-mover distance. For instance, for a given color i in the color palette of the input vector graphic, a set of flows is found between each color j in the updated dominant color palette that causes the earth-mover distance to be minimized. The set of flows allows for recoloring objects of the output vector graphic using color information from the updated dominant color palette, as described further below.

An illustrative example of a palette flow is provided in Table 1 below. In this simplified example, an updated dominant color palette has three output palette colors, and a proportional dominant color palette of an input vector graphic has three input palette colors. In this example, the palette flow is a data structure in which a record for a given color from a target palette identifies the set flows between that target color and the various updated dominant color palettes. For instance, a record for a first color (identified as "input palette color 1" in the example of Table 1) would include data (e.g., columns or other fields) identifying a flow of $f_{1,1}$ between the first input color and the first output color, a flow of $f_{1,2}$ between the first input color and the second output color, and a flow of $f_{1,3}$ between the first input color and the third output color.

TABLE 1

Palette flow example

| | Output Palette Color 1 | Output Palette Color 2 | Output Palette Color 3 |
|---|---|---|---|
| Input Palette Color 1 | $f_{1,1}$ | $f_{1,2}$ | $f_{1,3}$ |

TABLE 1-continued

Palette flow example

|  | Output Palette Color 1 | Output Palette Color 2 | Output Palette Color 3 |
|---|---|---|---|
| Input Palette Color 2 | $f_{2,1}$ | $f_{2,2}$ | $f_{2,3}$ |
| Input Palette Color 3 | $f_{3,1}$ | $f_{3,2}$ | $f_{3,3}$ |

In some embodiments, after obtaining the palette flow using earth-mover distance, the color update engine 612 attempts to harmonize the colors. In some embodiments, this is performed using the luminance value or without the luminance value. An example of such harmonization is found in Chang et al., "Palette-based Photo Recoloring," ACM Transactions on Graphics, 2015.

In some embodiments, the input color information included in the input graphic color information is mapped to the updated dominant color palette using a palette flow. For instance, the color update engine 612 maps a color from the proportional dominant color palette 602 to a color of the updated dominant color palette 610. In examples involving paths with constant colors, the particular color and the corresponding color within the proportional dominant color palette could be the same. In examples involving a palette color determined from a clustering process, the color update engine 612 identifies which color within the proportional dominant color palette was determined from the cluster to which the particular color was assigned.

In examples involving the minimization of an earth-mover distance, the color from the input graphic is mapped to a modified color that is a weighted combination of colors from the updated dominant color palette. The weights in this weighted combination are the set of flows between the colors of the updated dominant color palette and the color from the input graphic that cause the earth-mover distance to be minimized. An example of a formula representing this operation is provided below.

$$C'_{Ti} = \frac{\sum_{j=1}^{n} f_{C_{Ti}, C_{Ij}} \times C_{Ij}}{\sum_{j=1}^{n} f_{C_{Ti}, C_{Ij}}}$$

In this formula, a modified color $C'_{Ti}$ is computed from a set of flows $f_{C_{Ti}, C_{Ij}}$ between input color $C_{Ti}$ and an output color $C_{Ij}$. The summation of multiplying these flows by the output color $C_{Ij}$ is normalized with respect to the summation of these flows. For instance, in the example above, the term $\sum_{j=1}^{n} f_{C_{Ti}, C_{Ij}}$ is divided by the term $\sum_{j=1}^{n} f_{C_{Ti}, C_{Ij}}$.

The colors of the input graphic are then modified by changing the input color information to using the output color information. For instance, the color update engine 612 modifies a digital file including the input graphic to include updated color information. Examples of this modification include modifying color information for pixels of a target graphic that is a raster graphic, modifying the values of one or more color parameters of a target graphic that is a vector graphic, or some combination thereof. In some embodiments, performing a modification to the input graphic involves modifying a copy of the input graphic used in a preview function of the content design system 104. In additional or alternative embodiments, performing a modification to the input graphic involves creating a modified input graphic that is outputted by the dominant color editing system 106.

Figure 7:
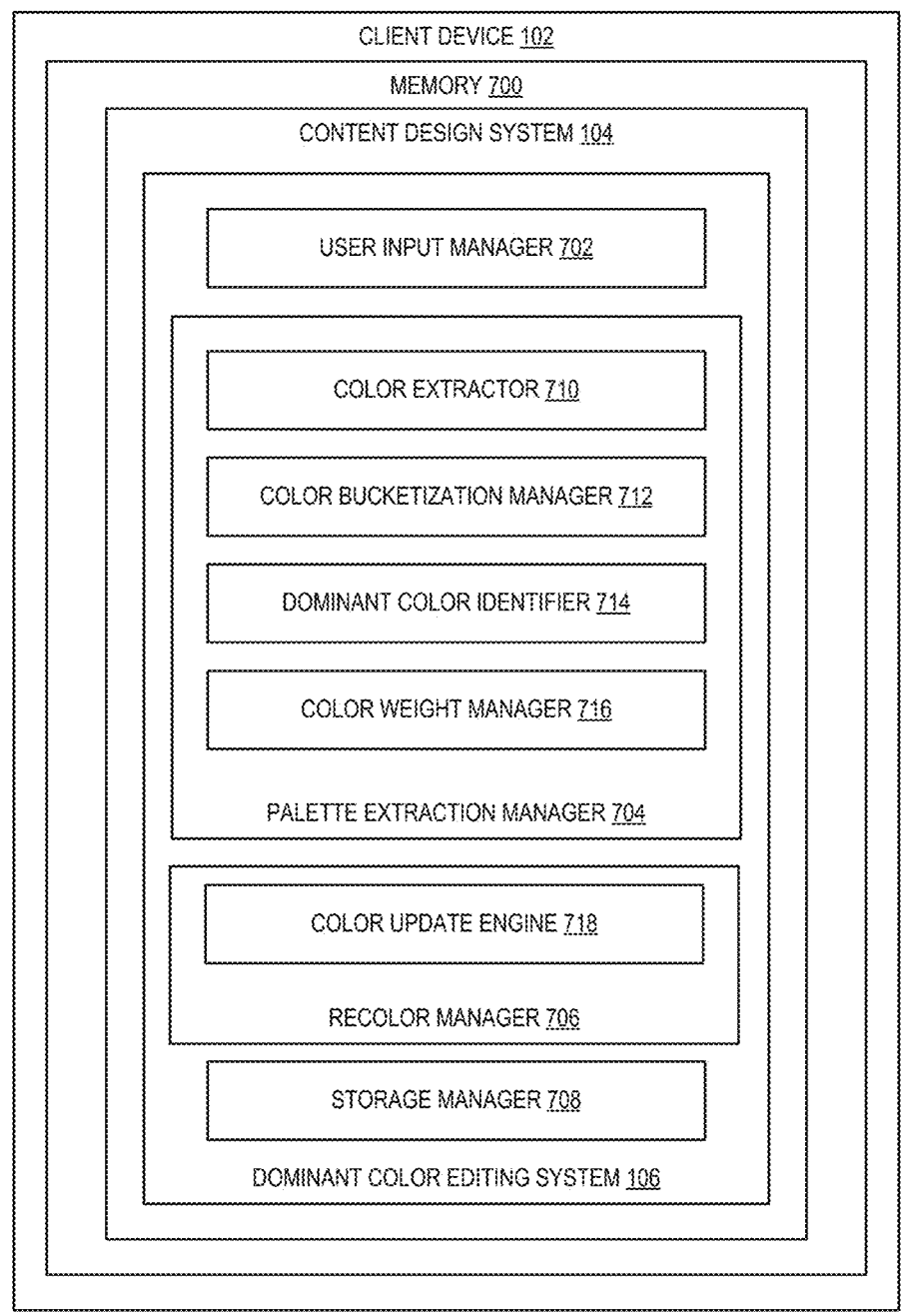
FIG. 7 illustrates a schematic diagram of dominant color editing system in accordance with one or more embodiments.

FIG. 7 illustrates a schematic diagram of a dominant color editing system 106 in accordance with one or more embodiments. In particular, FIG. 7 shows a schematic diagram of the editing system 106, the client device 102, and the content design system 104 described above in relation to FIG. 1. As mentioned in relation to FIG. 1, in one or more embodiments, some or all of the components of the editing system 106 are implemented separately from the content design system 104 and the client device 102.

As shown, the client device 102 includes memory 700, including volatile memory, non-volatile memory, storage media, etc. as further described below with respect at least to FIG. 11. The editing system is stored in memory as program code, data structures, etc. and includes a user input manager 702, a palette extraction manager 704, a recolor manager 706, and a storage manager 708. As shown, the palette extraction manager 704 includes a color extractor 710, a color bucketization manager 712, a dominant color identifier 714, a color weight manager 716. The recolor manager 706 includes color update engine 718.

The dominant color editing system 106 includes a user input manager 702 that allows users to provide input to the editing system. For example, the user input manager 702 allows users to select one or more vector graphics-based images to be analyzed and/or edited. In some embodiments, the user input manager 702 enables a user to select one or more vector graphics files stored or accessible by storage manager 708. Additionally, the user input manager 701 allows users to request the dominant color editing system to identify a proportional dominant color palette for the selected vector graphics. Further, the user input manager 702 allows users to edit the proportional dominant color palette (e.g., change color values, change the proportions of the dominant colors in the palette, etc.) such that the vector graphic is recolored accordingly.

The dominant color editing system 106 includes a palette extraction manager 704. As discussed above, the palette extraction manager 704 is responsible for determining the proportional dominant color palette of a given input vector graphic. The palette extraction manager 704 includes a color extractor 710. As discussed, the color extractor planarizes the input vector graphic to reduce any overlapping path objects in the vector graphic into a set of non-overlapping path objects (also referred to as planarized segments). Once the set of non-overlapping path objects of the vector graphic is obtained, then the color(s) of each path object is determined. For solid fill objects, the color associated with the fill is recorded. For more objects having a complex color type, such as pattern fill, gradient fill, texture fill, etc. the colors associated with the complex color types are recorded. This resulting set of colors is then provided to color bucketization manager 712 to group the colors according to similarity of color characteristics.

The palette extraction manager 704 also includes a color bucketization manager 712. Color bucketization manager 712 receives the set of colors from the color extractor 710 and groups the colors in the set of colors based on similarity of color characteristics, such as one or more of hue, tone, brightness, saturation, temperature, etc. The color bucketization manager iteratively evaluates each color from the set of colors to determine whether a color is similar to any other color that has already been processed. For example, the first color processed is added to a newly created bucket. The second color is then processed and the color bucketization manager 712 determines whether the second color is similar to the first color. When grouped by tone, this includes determining whether the second color is a tint or shade of the first color, as discussed above. However, in some embodiments, similarity of other color characteristics is used to group the colors. If the second color is similar to the first color, then it is added to the bucket with the first color. If the second color is not similar to the first color, then a second bucket is created, and the second color is added to the second bucket. This process continues until all colors in the set of colors have been processed into a set of buckets.

The palette extraction manager 704 also includes a dominant color identifier 714. The dominant color identifier 714 receives the set of buckets from the color bucketization manager 712. The dominant color identifier 714 then determines a dominant color for each bucket based on the colors in each bucket. For example, in some embodiments, the dominant color of a given bucket is the color from that bucket covering the largest area of the input vector graphic. Alternatively, the median color value of the bucket is identified as the dominant color. For example, if the colors in a bucket are sorted by shade and tint values, then the median shade or tint value is used to obtain the dominant color. In some embodiments, the color in the bucket closest to the median value is selected as the dominant color. Alternatively, the median color is the dominant color even if this color does not appear in the input vector graphic. As discussed, once the dominant color of each group has been identified, the dominant color identifier 714 calculates a relative color characteristic value between the dominant color and each color in that dominant color's group. For example, in embodiments where the colors are grouped by tone, the shade or tint value relative to the dominant color is stored. These values are stored by the storage manager 708 associated with the colors of each bucket. This enables the recolor manager to automatically recolor the vector graphic when changes are made to the proportional dominant color palette.

The palette extraction manager 704 also includes a color weight manager 716. As discussed, color weight manager 716 determines a weight associated with each dominant color in the input vector graphic. In some embodiments, the color weight manager 716 rasterizes the input vector graphic 200 and then determines the closest dominant color (e.g., based on hue, tone, or other color characteristics as discussed) to the color of each pixel. The weight associated with a given dominant color is incremented each time a pixel is determined to be closest to the dominant color. In some embodiments, the color weight manager normalizes the weights. For example, in some embodiments the weights are normalized such that the dominant color weights all fall between zero and one. Alternatively, the weights are normalized such that the weights add up a fixed value. A proportional dominant color palette is then generated using the resulting dominant color weights, where the width of each dominant color corresponds to the weight associated with that dominant color.

The dominant color editing system 106 also includes a recolor manager 706. As discussed, the proportional dominant color palette is editable by the user to make changes to the color of the corresponding vector graphic. For example, in some embodiments the user changes one or more dominant colors in proportional dominant color palette (e.g., changes the RGB value of the one or more dominant colors), as discussed above at least with respect to FIG. 5. The recolor manager then uses the relative color characteristic values associated with the colors in the bucket associated with the changed dominant color to recolor the colors accordingly. For example, when the colors are grouped according to tone, the storage manager stores relative tint and shade values associated with each color in each bucket. When the dominant color is changed, the recolor manager 706 combines the RGB values of the new dominant color with these relative tint and shade values to recolor each color from that dominant color's corresponding bucket.

Additionally, as discussed, the proportional dominant color palette is editable to change the proportions of the dominant colors in the proportional dominant color palette, as discussed above at least with respect to FIG. 6. For example, when the user adjusts the proportions of the proportional dominant color palette, they create an updated dominant color palette. The color update engine receives both the original proportional dominant color palette and the newly created updated dominant color palette and determines mappings between the two palettes. These mappings are then used by the color update engine to recolor the input vector graphic to create the recolored output vector graphic which now has a dominant color palette that matches the updated dominant color palette defined by the user.

As illustrated in FIG. 7, the content design system 104 also includes a storage manager 708. In general, the storage manager 708 maintains, stores, organizes, and/or retrieves data associated with the editing system 106. For example, the storage manager 708 maintains relative color characteristic data, as described above. Further, the storage manager 708 communicates with other components of the editing system 106 to facilitate identifying proportional dominant color palettes of vector graphics and recoloring the vector graphics based on changes made to their corresponding proportional dominant color palettes.

Each of the components 702-718 of the dominant color editing system 106 and their corresponding elements (as shown in FIG. 7) are in communication with one another using any suitable communication technologies. It will be recognized that although components 702-718 and their corresponding elements are shown to be separate in FIG. 7, any of components 702-718 and their corresponding elements are combinable into fewer components, such as into a single facility or module, divided into more components, or configured into different components as serves a particular embodiment.

The components 702-718 and their corresponding elements comprise software, hardware, or both. For example, the components 702-718 and their corresponding elements comprise one or more instructions stored on a computer-readable storage medium and executable by processors of one or more computing devices. When executed by the one or more processors, the computer-executable instructions of the dominant color editing system 106 cause a client device and/or a server device to perform the methods described herein. Alternatively, the components 702-718 and their corresponding elements comprise hardware, such as a special purpose processing device to perform a certain function or group of functions. Additionally, the components 702-718 and their corresponding elements comprise a combination of computer-executable instructions and hardware.

Furthermore, the components 702-718 of the dominant color editing system 106, for example, are implementable as one or more stand-alone applications, as one or more modules of an application, as one or more plug-ins, as one or more library functions or functions that are called by other applications, and/or as a cloud-computing model. Thus, the components 702-718 of the dominant color editing system 106 are implemented as a stand-alone application, such as a desktop or mobile application. Furthermore, the components 702-718 of the dominant color editing system 106 are implemented, in some embodiments, as one or more web-based applications hosted on a remote server. Alternatively, or additionally, in some embodiments, the components of the dominant color editing system 106 are implemented in a suite of mobile device applications or "apps." To illustrate, in some embodiments, the components of the dominant color editing system 106 are implemented in a content design application, including but not limited to ADOBE® ILLUSTRATOR®. "ADOBE®" and "ILLUSTRATOR®" are either a registered trademark or trademark of Adobe Inc. in the United States and/or other countries.

Figure 8:
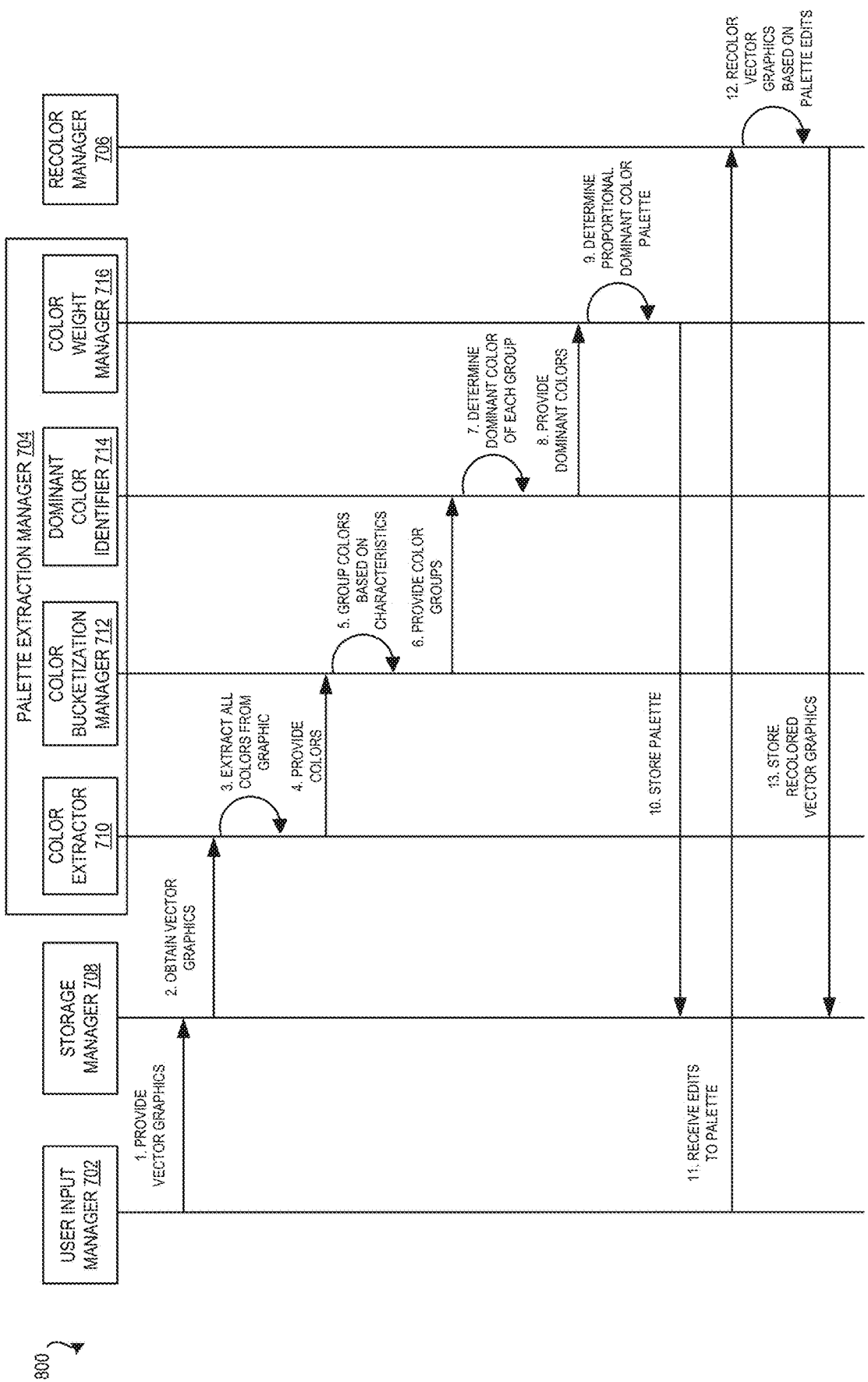
FIG. 8 illustrates a sequence diagram of dominant color palette identification and editing in accordance with one or more embodiments.

FIG. 8 illustrates a sequence diagram 800 of dominant color palette identification and editing in accordance with one or more embodiments. As shown in FIG. 8, at numeral 1 a user provides a vector graphic via user input manager 702. For example, in some embodiments, the user selects a vector graphics that is accessible to storage manager 708 (e.g., locally or remotely). At numeral 2, the color extractor 710 obtains the vector graphic via storage manager 708. At numeral 3, the color extractor extracts all colors from the vector graphic, as described above at least with respect to FIGS. 2 and 3. At numeral 4, the color extractor provides the resulting set of colors to color bucketization manager 712.

At numeral 5, the color bucketization manager 712 groups the colors in the set of colors based on similar color characteristics. As discussed, the color characteristics include one or more of hue, tone, temperature, etc. For example, when grouped according to tone, the color bucketization manager determines whether a color being processed is a tint or shade of a color that has already been processed. If so, the color being processed is added to the corresponding bucket. If not, a new bucket is created for the color being processed and the color bucketization manager moved on to process the next color. This processing proceeds until all colors from the set of colors have been processed.

At numeral 6, the set of buckets of colors (e.g., groups) are provided to dominant color identifier 714. The dominant color identifier determines a dominant color associated with each bucket, at numeral 7. For example, as discussed, the dominant color identifier selects the color covering the most area (e.g., largest number of pixels) as the dominant color. In some embodiments the dominant color identifier selects a median color based on the color characteristic(s) on which the colors have been grouped. At numeral 8, the dominant colors are provided to color weight manager 716. At numeral 9, color weight manager 716 determines a weight associated with each dominant color. For example, as discussed, color weight manager rasterizes the vector graphic and then determines, for each pixel, a dominant color closest to that pixel (e.g., based on the color characteristic(s) used to group the colors), and increments the weight associated with that dominant color. Once the pixels have been processed, the color weight manager 716 then normalizes the weights. The color weight manager then stores a proportional dominant color palette that includes the dominant colors weighted according to their corresponding weights, at numeral 10.

At numeral 11, the user makes one or more changes to the proportional dominant color palette via user input manager 702. As discussed, the user edits the proportional dominant color palette to automatically recolor the vector graphic. At numeral 12, the recolor manager recolors the vector graphic based on the users changes to the proportional dominant color palette. For example, as discussed, in some embodiments the user changes one or more of the dominant colors from a first color to a second color. The recolor manager then uses the relative color characteristics to recolor each color associated with the bucket of that dominant color accordingly. Additionally, as discussed, in some embodiments the user changes the proportions of the dominant colors in the proportional dominant color palette. The recolor manager then maps the color distribution of the vector graphic to the new distribution based on the updated proportional dominant color palette.

Figure 9:
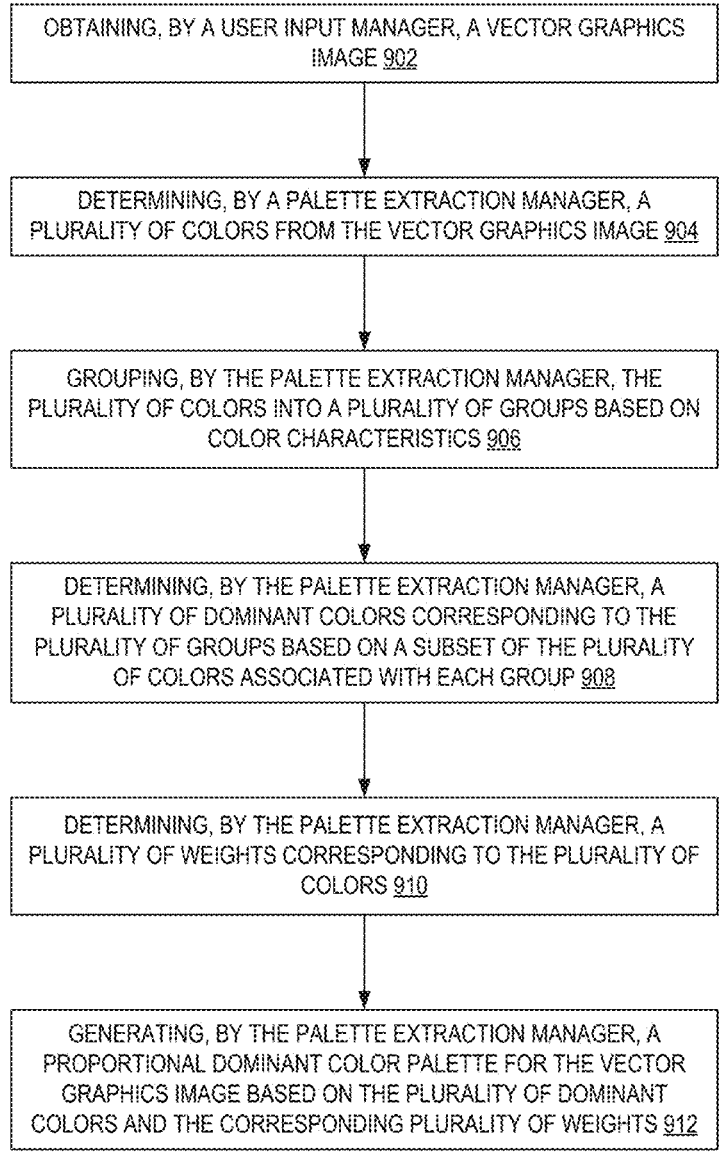
FIG. 9 illustrates a flowchart of a series of acts in a method of dominant color palette identification and editing in accordance with one or more embodiments.

FIGS. 1-8, the corresponding text, and the examples, provide a number of different systems and devices that enables a dominant color palette for a vector graphic to be identified and allows a user to edit the dominant color palette to recolor the vector graphic. In addition to the foregoing, embodiments are also described in terms of flowcharts comprising acts and steps in a method for accomplishing a particular result. For example, FIG. 9 illustrates a flowchart of an exemplary method in accordance with one or more embodiments. The method described in relation to FIG. 9 are performable with fewer or more steps/acts or the steps/acts are performable in differing orders. Additionally, the steps/acts described herein are repeatable or performable in parallel with one another or in parallel with different instances of the same or similar steps/acts.

FIG. 9 illustrates a flowchart 900 of a series of acts in a method of ZZZZ in accordance with one or more embodiments. In one or more embodiments, the method 900 is performed in a digital medium environment that includes the dominant color editing system 106. The method 900 is intended to be illustrative of one or more methods in accordance with the present disclosure and is not intended to limit potential embodiments. Alternative embodiments include additional, fewer, or different steps than those articulated in FIG. 9.

As illustrated in FIG. 9, the method 900 includes an act 902 of obtaining, by a user input manager, a vector graphic. For example, the user creates a vector graphic in a content design system, loads the vector graphic into the content design system via a file stored locally or accessible remotely, etc. In some embodiments, the vector graphic includes the entire vector graphic selected by the user. Alternatively, the vector graphic includes a subset of path objects in a vector graphic selected by the user.

As illustrated in FIG. 9, the method 900 includes an act 904 of determining, by a palette extraction manager, a plurality of colors from the vector graphic. As discussed, in some embodiments, the palette extraction manager includes a color extractor which planarizes the vector graphic to flatten all path object to the same plane. The color characteristics (e.g., stroke color, fill color, etc.) are then extracted from these planarized segments to determine the colors present in the vector graphic.

As illustrated in FIG. 9, the method 900 includes an act 906 of grouping, by the palette extraction manager, the plurality of colors into a plurality of groups based on color characteristics. In some embodiments, grouping includes adding, by the palette extraction manager, a first color from the plurality of colors to a first group, determining, by the palette extraction manager, if a second color from the plurality of colors is a shade or a tint of the first color, if the second color is a shade or a tint of the first color, then adding, by the palette extraction manager, the second color to the first group, and if the second color is not a shade or a tint of the first color, then adding, by the palette extraction manager, the second color to a second group. Alternatively, the colors are grouped according to different color characteristics.

As illustrated in FIG. 9, the method 900 includes an act 908 of determining, by the palette extraction manager, a plurality of dominant colors corresponding to the plurality of groups based on a subset of the plurality of colors associated with each group. In some embodiments, determining the dominant colors includes determining a median color values of a set of colors in the first group, wherein the median color value is the dominant color associated with the first group. Alternatively, the dominant color of a given group is determined to be the color of that group that occupies the most pixels in the rasterized vector graphic.

As illustrated in FIG. 9, the method 900 includes an act 910 of determining, by the palette extraction manager, a plurality of weights corresponding to the plurality of colors. In some embodiments, the weights are determined based on the are covered by the colors belonging to the group. For example, the vector graphic is rasterized, and the color of each pixel is inspected. The dominant color most similar to a pixel has its weight incremented by one. Once the pixels have all been processed, in some embodiments the weights are normalized.

As illustrated in FIG. 9, the method 900 includes an act 912 of generating, by the palette extraction manager, a proportional dominant color palette for the vector graphic based on the plurality of dominant colors and the corresponding plurality of weights. As discussed, the proportional dominant color palette indicates the dominant colors of the vector graphic, where each dominant color's size in the palette indicates the proportion of that dominant color in the vector graphic.

In some embodiments, the method further includes receiving, by the user input manager, a request to recolor the vector graphic, the request including a change to the proportional dominant color palette, and recoloring, by a recolor manager, the vector graphic based on the change to the proportional dominant color palette to generate a recolored vector graphic image. In some embodiments, the change to the proportional dominant color palette includes replacing a first color value associated with a first dominant color with a second color value.

In some embodiments, recoloring, by a recolor manager, the vector graphic based on the change to the proportional dominant color palette to generate a recolored vector graphic image, further comprises updating, by the recolor manager, the first color value associated with the first dominant color to the second color value, and updating, by the recolor manager, color values associated with a first set of colors from a first group associated the first dominant color based on relative color property data associated with the first group. In some embodiments, the relative color property data includes tint or shade values associated with each color from the set of colors relative to the first dominant color.

In some embodiments, the change to the proportional dominant color palette includes updating weights associated with the dominant colors to create an updated dominant color palette, wherein the dominant colors have different proportions in the updated dominant color palette than the proportional dominant color palette. In some embodiments, recoloring, by a recolor manager, the vector graphic based on the change to the proportional dominant color palette to generate a recolored vector graphic image, further comprises computing, by the recolor manager, a palette flow that maps colors of the proportional dominant color palette to colors of the updated dominant color palette, wherein the palette flow is computed based on an amount of work required to transform a color distribution of the proportional dominant color palette into a color distribution of the updated dominant color palette, mapping, by the recolor manager, at least one color from the vector graphic to at least one modified color using the palette flow, and updating, by the recolor manager, a color value associated with the at least one color to a color value associated with the at least one modified color.

Figure 10:
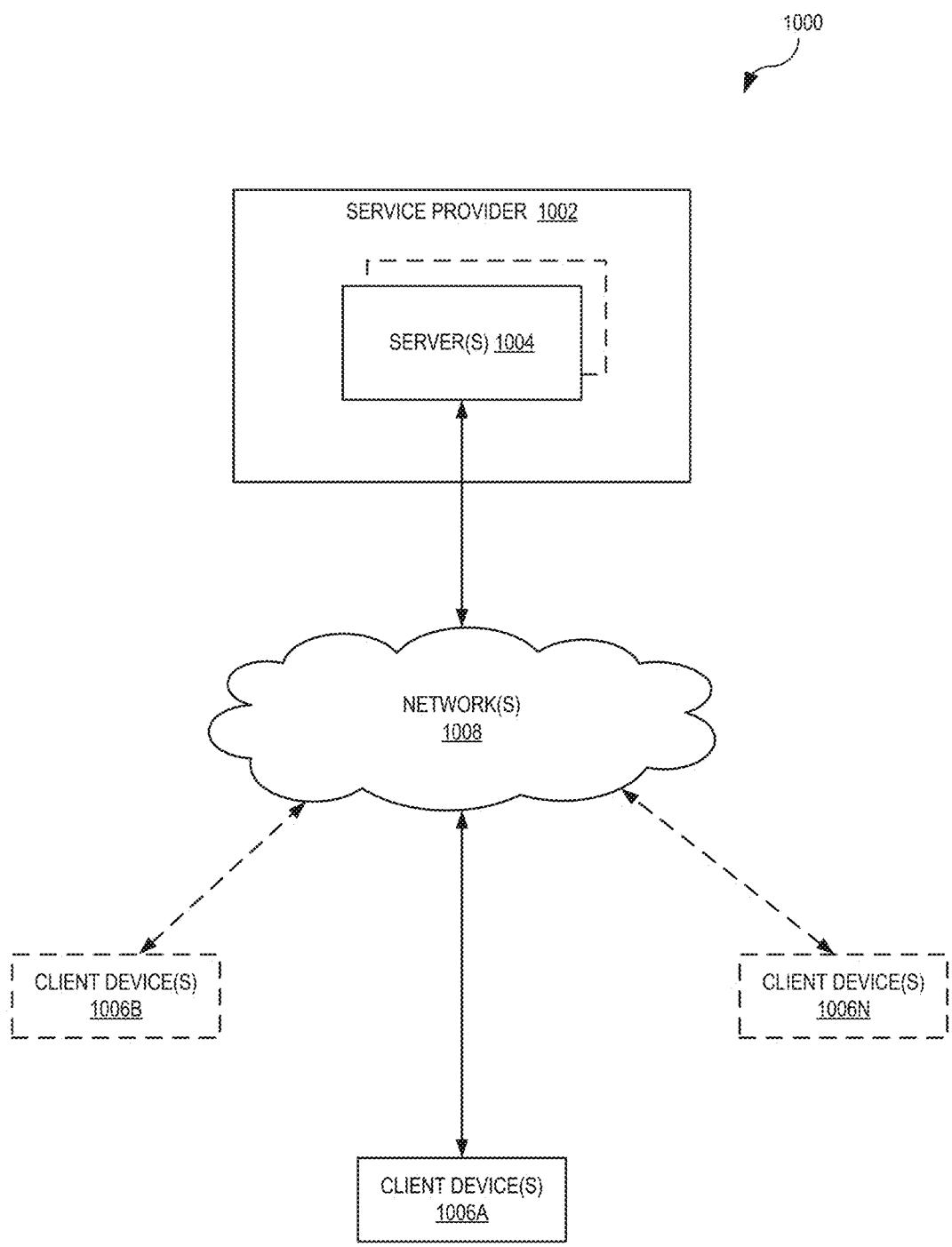
FIG. 10 illustrates a schematic diagram of an exemplary environment in which the image processing system operates in accordance with one or more embodiments.

FIG. 10 illustrates a schematic diagram of an exemplary environment 1000 in which the content design system 104 operates in accordance with one or more embodiments. In one or more embodiments, the environment 1000 includes a service provider 1002 which includes one or more servers 1004 connected to a plurality of client devices 1006A-1006N via one or more networks 1008. The client devices 1006A-1006N, the one or more networks 1008, the service provider 1002, and the one or more servers 1004 communicate with each other or other components using any communication platforms and technologies suitable for transporting data and/or communication signals, including any known communication technologies, devices, media, and protocols supportive of remote data communications, examples of which are described in more detail below with respect to FIG. 11.

Although FIG. 10 illustrates a particular arrangement of the client devices 1006A-1006N, the one or more networks 1008, the service provider 1002, and the one or more servers 1004, various additional arrangements are possible. For example, the client devices 1006A-1006N directly communicate with the one or more servers 1004, bypassing the network 1008. Or alternatively, the client devices 1006A-1006N directly communicate with each other. The service provider 1002 is a public cloud service provider which owns and operates their own infrastructure in one or more data centers and provides this infrastructure to customers and end users on demand to host applications on the one or more servers 1004. The servers include one or more hardware servers (e.g., hosts), each with its own computing resources (e.g., processors, memory, disk space, networking bandwidth, etc.) which are securely divided between multiple customers, each of which host their own applications on the one or more servers 1004. In some embodiments, the service provider is a private cloud provider which maintains cloud infrastructure for a single organization. The one or more servers 1004 similarly include one or more hardware servers, each with its own computing resources, which are divided among applications hosted by the one or more servers for use by members of the organization or their customers.

Similarly, although the environment 1000 of FIG. 10 is depicted as having various components, the environment 1000 has additional or alternative components. For example, the environment 1000 is implemented on a single computing device with the content design system 104. In particular, the content design system 104 is implemented in whole or in part on the client device 1002A.

As illustrated in FIG. 10, the environment 1000 includes client devices 1006A-1006N. The client devices 1006A-1006N comprise any computing device. For example, client devices 1006A-1006N comprise one or more personal computers, laptop computers, mobile devices, mobile phones, tablets, special purpose computers, TVs, or other computing devices, including computing devices described below with regard to FIG. 11. Although three client devices are shown in FIG. 10, it is appreciated that client devices 1006A-1006N comprise any number of client devices (greater or smaller than shown).

Moreover, as illustrated in FIG. 10, the client devices 1006A-1006N and the one or more servers 1004 communicate via one or more networks 1008. The one or more networks 1008 represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1008 include any suitable network over which the client devices 1006A-1006N access service provider 1002 and server 1004, or vice versa. The one or more networks 1008 are discussed in more detail below with regard to FIG. 11.

In addition, the environment 1000 also includes one or more servers 1004. The one or more servers 1004 generate, store, receive, and/or transmit any type of data, including input image data 1012, output image data 1014, or other information. For example, a server 1004 receives data from a client device, such as the client device 1006A, and send the data to another client device, such as the client device 1002B and/or 1002N. The server 1004 also transmits electronic messages between one or more users of the environment 1000. In one example embodiment, the server 1004 is a data server. The server 1004 also comprises a communication server or a web-hosting server. Additional details regarding the server 1004 are discussed below with respect to FIG. 11.

As mentioned, in one or more embodiments, the one or more servers 1004 include or implement at least a portion of the content design system 104. In particular, the content design system 104 comprises an application running on the one or more servers 1004 or a portion of the content design system 104 is downloaded from the one or more servers 1004. For example, the content design system 104 includes a web hosting application that allows the client devices 1006A-1006N to interact with content hosted at the one or more servers 1004. To illustrate, in one or more embodiments of the environment 1000, one or more client devices 1006A-1006N access a webpage supported by the one or more servers 1004. In particular, the client device 1006A runs a web application (e.g., a web browser) to allow a user to access, view, and/or interact with a webpage or website hosted at the one or more servers 1004.

Upon the client device 1006A accessing a webpage or other web application hosted at the one or more servers 1004, in one or more embodiments, the one or more servers 1004 provide access to one or more drawing files that include vector graphics stored at the one or more servers 1004. Moreover, the client device 1006A receives a request (i.e., via user input) to modify a proportional dominant color palette and provide the request to the one or more servers 1004. Upon receiving the request, the one or more servers 1004 automatically performs the methods and processes described above to recolor the vector graphics in the drawing file based on the changes made to the proportional dominant color palette.

As just described, the content design system 104 is implemented in whole, or in part, by the individual elements 1002-1008 of the environment 1000. It is appreciated that although certain components of the content design system 104 are described in the previous examples with regard to particular elements of the environment 1000, various alternative implementations are possible. For instance, in one or more embodiments, the content design system 104 is implemented on any of the client devices 1006A-N. Similarly, in one or more embodiments, the content design system 104 is implemented on the one or more servers 1004. Moreover, different components and functions of the content design system 104 is implemented separately among client devices 1006A-1006N, the one or more servers 1004, and the network 1008.

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein are implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media include any available media that are accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which is used to store desired program code means in the form of computer-executable instructions or data structures and which is accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links which are used to carry desired program code means in the form of computer-executable instructions or data structures and which are accessed by a general purpose or special purpose computer. Combinations of the above are included within the scope of computer-readable media.

Further, upon reaching various computer system components, program code means in the form of computer-executable instructions or data structures are transferred automatically from transmission media to non-transitory computer-readable storage media (devices) (or vice versa). For example, computer-executable instructions or data structures received over a network or data link are buffered in RAM within a network interface module (e.g., a "NIC"), and then eventually transferred to computer system RAM and/or to less volatile computer storage media (devices) at a computer system. Thus, it is to be understood that non-transitory computer-readable storage media (devices) are included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions are, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art appreciate that some embodiments of the disclosure are practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure is implementable in distributed system environments where local and remote computer systems, which are linked (either by hardwired data links, wireless data links, or by a combination of hardwired and wireless data links) through a network, both perform tasks. In a distributed system environment, program modules are located in both local and remote memory storage devices.

Embodiments of the present disclosure are implemented in cloud computing environments. In this description, "cloud computing" is defined as a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model includes various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). A cloud-computing model is deployed using different deployment models such as private cloud, community cloud, public cloud, hybrid cloud, and so forth. In this description and in the claims, a "cloud-computing environment" is an environment in which cloud computing is employed.

Figure 11:
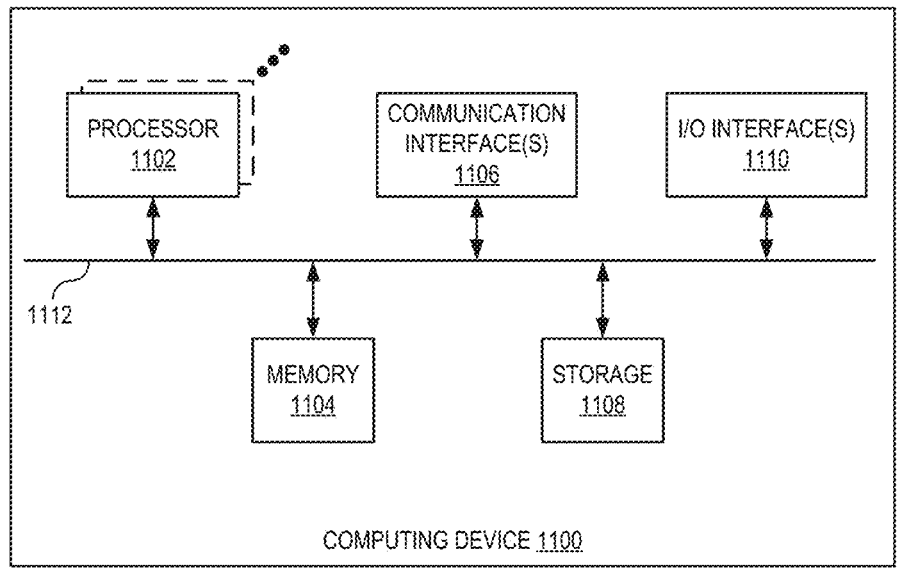
FIG. 11 illustrates a block diagram of an exemplary computing device in accordance with one or more embodiments.

FIG. 11 illustrates, in block diagram form, an exemplary computing device 1100 that is configured to perform one or more of the processes described above. One appreciates that one or more computing devices such as the computing device 1100 implement the content design system. As shown by FIG. 11, the computing device comprises a processor 1102, memory 1104, one or more communication interfaces 1106, a storage device 1108, and one or more I/O devices/interfaces 1110. In certain embodiments, the computing device 1100 includes fewer or more components than those shown in FIG. 11. Components of computing device 1100 shown in FIG. 11 are described in additional detail below.

In particular embodiments, processor(s) 1102 includes hardware for executing instructions, such as those making up a computer program. As an example, and not by way of limitation, to execute instructions, processor(s) 1102 retrieves (or fetch) the instructions from an internal register, an internal cache, memory 1104, or a storage device 1108 and decode and execute them. In various embodiments, the processor(s) 1102 includes one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 is used for storing data, metadata, and programs for execution by the processor(s). The memory 1104 includes one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 includes internal or distributed memory.

The computing device 1100 further includes one or more communication interfaces 1106. A communication interface 1106 includes hardware, software, or both. The communication interface 1106 provides one or more interfaces for communication (such as, for example, packet-based communication) between the computing device and one or more other computing devices 1100 or one or more networks. As an example, and not by way of limitation, communication interface 1106 includes a network interface controller (NIC) or network adapter for communicating with an Ethernet or other wire-based network or a wireless NIC (WNIC) or wireless adapter for communicating with a wireless network, such as a WI-FI. The computing device 1100 further includes a bus 1112. The bus 1112 comprises hardware, software, or both that couples components of computing device 1100 to each other.

The computing device 1100 includes a storage device 1108 includes storage for storing data or instructions. As an example, and not by way of limitation, storage device 1108 comprises a non-transitory storage medium described above. The storage device 1108 includes a hard disk drive (HDD), flash memory, a Universal Serial Bus (USB) drive or a combination these or other storage devices.

The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 includes a mouse, keypad or a keyboard, a touch screen, camera, optical scanner, network interface, modem, other known I/O devices or a combination of such I/O devices/interfaces 1110. The touch screen is activated with a stylus or a finger.

The I/O devices/interfaces 1110 includes one or more devices for presenting output to a user, including, but not limited to, a graphics engine, a display (e.g., a display screen), one or more output drivers (e.g., display drivers), one or more audio speakers, and one or more audio drivers.

In certain embodiments, I/O devices/interfaces 1110 is configured to provide graphical data to a display for presentation to a user. The graphical data is representative of one or more graphical user interfaces and/or any other graphical content as serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments include other specific forms without departing from its spirit or essential characteristics. The described embodiments are to be considered in all respects only as illustrative and not restrictive. For example, the methods described herein are performable with fewer or more steps/acts or the steps/acts are performable in differing orders. Additionally, the steps/acts described herein are repeatable or performable in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor is it to be understood to, imply that a given embodiment requires at least one of A, at least one of B, or at least one of C to each be present.

We claim:

1. A computer-implemented method comprising:
    obtaining, by a user input manager, a vector graphic;
    determining, by a palette extraction manager, a plurality of colors from the vector graphic;
    grouping, by the palette extraction manager, the plurality of colors into a plurality of groups based on color characteristics;
    determining, by the palette extraction manager, a plurality of dominant colors corresponding to the plurality of groups based on a subset of the plurality of colors associated with each group;
    determining, by the palette extraction manager, a plurality of weights corresponding to the plurality of colors;
    generating, by the palette extraction manager, a proportional dominant color palette for the vector graphic based on the plurality of dominant colors and the corresponding plurality of weights;
    receiving, by the user input manager, a request to recolor the vector graphic, the request including a change to the proportional dominant color palette; and
    recoloring, by a recolor manager, the vector graphic based on the change to the proportional dominant color palette to generate a recolored vector graphic image.

2. The computer-implemented method of claim 1, wherein the change to the proportional dominant color palette includes replacing a first color value associated with a first dominant color with a second color value.

3. The computer-implemented method of claim 2, wherein recoloring, by a recolor manager, the vector graphic based on the change to the proportional dominant color palette to generate a recolored vector graphic image, further comprises:
    updating, by the recolor manager, the first color value associated with the first dominant color to the second color value; and
    updating, by the recolor manager, color values associated with a first set of colors from a first group associated the first dominant color based on relative color property data associated with the first group.

4. The computer-implemented method of claim 3, wherein the relative color property data includes tint or shade values associated with each color from the set of colors relative to the first dominant color.

5. The computer-implemented method of claim 1, wherein the change to the proportional dominant color palette includes updating weights associated with the dominant colors to create an updated dominant color palette, wherein the dominant colors have different proportions in the updated dominant color palette than the proportional dominant color palette.

6. The computer-implemented method of claim 5, wherein recoloring, by a recolor manager, the vector graphic based on the change to the proportional dominant color palette to generate a recolored vector graphic image, further comprises:
    computing, by the recolor manager, a palette flow that maps colors of the proportional dominant color palette to colors of the updated dominant color palette, wherein the palette flow is computed based on an amount of work required to transform a color distribution of the proportional dominant color palette into a color distribution of the updated dominant color palette;
    mapping, by the recolor manager, at least one color from the vector graphic to at least one modified color using the palette flow; and
    updating, by the recolor manager, a color value associated with the at least one color to a color value associated with the at least one modified color.

7. The computer-implemented method of claim 1, wherein grouping, by the palette extraction manager, the plurality of colors into a plurality of groups based on color characteristics, further comprises:
    adding, by the palette extraction manager, a first color from the plurality of colors to a first group;
    determining, by the palette extraction manager, if a second color from the plurality of colors is a shade or a tint of the first color;
    if the second color is a shade or a tint of the first color, then adding, by the palette extraction manager, the second color to the first group; and
    if the second color is not a shade or a tint of the first color, then adding, by the palette extraction manager, the second color to a second group.

8. The computer-implemented method of claim 7, wherein determining, by the palette extraction manager, a plurality of dominant colors corresponding to the plurality of groups based on a subset of the plurality of colors associated with each group, further comprises:
    determining a median color values of a set of colors in the first group, wherein the median color value is the dominant color associated with the first group.

9. A system, comprising:
    a computing device implementing a dominant color editing system, the dominant color editing system comprising:

a user input manager to obtain a vector graphic;

a palette extraction manager to:

determine a plurality of colors from the vector graphic;

group the plurality of colors into a plurality of groups based on color characteristics;

determine a plurality of dominant colors corresponding to the plurality of groups based on a subset of the plurality of colors associated with each group;

determine a plurality of weights corresponding to the plurality of colors; and generate a proportional dominant color palette for the vector graphic based on the plurality of dominant colors and the corresponding plurality of weights; and a recolor manager to:

receive a request to recolor the vector graphic via the user input manager, the request including a change to the proportional dominant color palette; and recolor the vector graphic based on the change to the proportional dominant color palette to generate a recolored vector graphic image.

10. The system of claim 9, wherein the change to the proportional dominant color palette includes replacing a first color value associated with a first dominant color with a second color value.

11. The system of claim 10, wherein to recolor the vector graphic based on the change to the proportional dominant color palette to generate a recolored vector graphic image, the recolor manager is further configured to:

update the first color value associated with the first dominant color to the second color value; and update color values associated with a first set of colors from a first group associated the first dominant color based on relative color property data associated with the first group.

12. The system of claim 11, wherein the relative color property data includes tint or shade values associated with each color from the set of colors relative to the first dominant color.

13. The system of claim 9, wherein the change to the proportional dominant color palette includes updating weights associated with the dominant colors to create an updated dominant color palette, wherein the dominant colors have different proportions in the updated dominant color palette than the proportional dominant color palette.

14. The system of claim 13, wherein to recolor the vector graphic based on the change to the proportional dominant color palette to generate a recolored vector graphic image, the recolor manager is further configured to:

compute a palette flow that maps colors of the proportional dominant color palette to colors of the updated dominant color palette, wherein the palette flow is computed based on an amount of work required to transform a color distribution of the proportional dominant color palette into a color distribution of the updated dominant color palette;

map at least one color from the vector graphic to at least one modified color using the palette flow; and update a color value associated with the at least one color to a color value associated with the at least one modified color.

15. A system comprising:

means for obtaining a vector graphic;

means for determining a plurality of colors from the vector graphic;

means for grouping the plurality of colors into a plurality of groups based on color characteristics;

means for determining a plurality of dominant colors corresponding to the plurality of groups based on a subset of the plurality of colors associated with each group;

means for determining a plurality of weights corresponding to the plurality of colors;

means for generating a proportional dominant color palette for the vector graphic based on the plurality of dominant colors and the corresponding plurality of weights;

means for receiving a request to recolor the vector graphic, the request including a change to the proportional dominant color palette; and means for recoloring the vector graphic based on the change to the proportional dominant color palette to generate a recolored vector graphic image.

16. The system of claim 15, wherein the change to the proportional dominant color palette includes replacing a first color value associated with a first dominant color with a second color value.

17. The system of claim 16, wherein the means for recoloring the vector graphic based on the change to the proportional dominant color palette to generate a recolored vector graphic image, further comprises:

means for updating the first color value associated with the first dominant color to the second color value; and updating, by the recolor manager, color values associated with a first set of colors from a first group associated the first dominant color based on relative color property data associated with the first group.

\* \* \* \* \*